(12) United States Patent
Ishii et al.

(10) Patent No.: US 9,338,351 B2
(45) Date of Patent: May 10, 2016

(54) IMAGING DEVICE, IMAGING SYSTEM, METHOD OF ACTIVATING IMAGING DEVICE, AND COMPUTER READABLE RECORDING MEDIUM SAVING PROGRAM

(71) Applicant: Olympus Corporation, Shibuya-ku, Tokyo (JP)

(72) Inventors: Kensuke Ishii, Tokyo (JP); Saori Matsumoto, Tokyo (JP); Arata Shinozaki, Tokyo (JP); Kiiko Takamatsu, Tokyo (JP); Yoshitaka Sato, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/717,611

(22) Filed: May 20, 2015

(65) Prior Publication Data
US 2016/0105611 A1 Apr. 14, 2016

Related U.S. Application Data

(63) Continuation of application No. PCT/JP2014/077168, filed on Oct. 10, 2014.

(51) Int. Cl.
*H04N 5/225* (2006.01)
*H04N 5/232* (2006.01)

(52) U.S. Cl.
CPC ....... *H04N 5/23245* (2013.01); *H04N 5/23206* (2013.01); *H04N 5/23241* (2013.01)

(58) Field of Classification Search
CPC ............ G06F 12/023; G06F 17/30138; G06F 3/0644; H04N 5/23241; H04N 5/3698; H04N 1/00885; G03B 2217/007; G03B 7/26; G09B 9/305; H01M 10/623; H02M 3/00; H02M 7/00

USPC .................. 348/231.3, 372, 207.99
See application file for complete search history.

(56) References Cited

U.S. PATENT DOCUMENTS

| 8,194,180 | B2 * | 6/2012 | Shibuno ................. | G03B 13/00 348/372 |
| 2004/0165073 | A1 * | 8/2004 | Hayashi ................ | G06F 9/4401 348/207.99 |

(Continued)

FOREIGN PATENT DOCUMENTS

| JP | 2003-274267 | 9/2003 |
| JP | 2005-333581 | 12/2005 |

(Continued)

OTHER PUBLICATIONS

Notification of Transmittal of International Search Report and Written Opinion of International Search Authority (2 pgs.), International Search Report (3 pgs.) with translation (1 pg.) and Written Opinion of International Search Authority (3 pgs.), with translation (3 pgs.) for PCT/JP2014/077168.

*Primary Examiner* — Tuan Ho
*Assistant Examiner* — Zhenzhen Wu
(74) *Attorney, Agent, or Firm* — John C. Pokotylo; Straub & Pokotylo

(57) ABSTRACT

An imaging device includes a power operation switch, a shooting operation switch, an imaging module, a memory, and a control unit. The shooting operation switch is in any one of a plurality of states including a first state and a second state. After the imaging device is activated, a shooting instruction operation is not received in the first state, and is received in the second state. The memory stores first shooting mode information and second shooting mode information. The control unit activates the imaging device in the first shooting mode when the shooting operation switch is in the first state during a power source transitions from the OFF state to the ON state. The control unit activates the imaging device in the second shooting mode when the shooting operation switch is in the second state and the power source transitions from the OFF state to the ON state.

11 Claims, 17 Drawing Sheets

(56) References Cited

U.S. PATENT DOCUMENTS

2005/0062878 A1* 3/2005 Ogawa ............... H04N 5/232
                                                      348/372
2011/0007145 A1   1/2011 Shigeeda
2014/0253742 A1   9/2014 Ishii

FOREIGN PATENT DOCUMENTS

| JP | 2008-015015 | 1/2008 |
| JP | 2011-019019 | 1/2011 |
| JP | 2014-175729 | 9/2014 |

* cited by examiner

FIG. 7

| STATE OF SHOOTING OPERATION SWITCH | SHOOTING MODE | |
|---|---|---|
| FIRST STATE | FIRST SHOOTING MODE (NORMAL IMAGING) | A21 |
| SECOND STATE | SECOND SHOOTING MODE (MOVING IMAGE IMAGING) | A22 |
| THIRD STATE | THIRD SHOOTING MODE (TIMER IMAGING) | A23 |

IMAGING DEVICE, IMAGING SYSTEM, METHOD OF ACTIVATING IMAGING DEVICE, AND COMPUTER READABLE RECORDING MEDIUM SAVING PROGRAM

BACKGROUND OF THE INVENTION

1. Field of the Invention

The present invention relates to an imaging device, an imaging system, a method of activating an imaging device, and a computer readable recording medium saving program.

The present application claims the benefit of priority based on International Application No. PCT/JP2014/077168, filed on Oct. 10, 2014 and is a continuation application based on International Application No PCT/JP2014/077168, and the entire content of the PCT International Application is incorporated herein by reference.

2. Description of Related Art

Imaging devices with improved operability have been disclosed. For example, in a digital camera disclosed in JP 2008-15015A, a shooting mode corresponding to a period of time until a shutter button enters a certain state is set.

In a technique disclosed in JP 2008-15015A, after photography preparation is completed and a shutter button is pushed, measurement of a period of time starts. For this reason, in the technique disclosed in JP 2008-15015A, a process of setting a shooting mode is not performed while a process of activating a digital camera is being performed. Thus, in the technique disclosed in JP 2008-15015A, it is difficult to start imaging in a desired shooting mode directly after the digital camera is activated.

SUMMARY OF THE INVENTION

According to a first aspect of the present invention, an imaging device is an imaging device that is activated in any one of a plurality of shooting modes including a first shooting mode and a second shooting mode different from the first shooting mode, and includes a power operation switch configured to receive an operation of turning on a power source of the imaging device, a shooting operation switch configured to be in any one of a plurality of states including a first state and a second state, not to receive a shooting instruction operation in the first state, and to receive the shooting instruction operation in the second state after the imaging device is activated, an imaging module configured to perform imaging when the power source is turned on and the shooting operation switch is in the second state, a memory configured to store first shooting mode information indicating the first shooting mode and second shooting mode information indicating the second shooting mode, and a control unit configured to activate the imaging device, wherein, when the shooting operation switch is in the first state during the power source transitions from an OFF state to an ON state, the control unit reads the first shooting mode information from the memory, and activates the imaging device in the first shooting mode indicated by the read first shooting mode information, and when the shooting operation switch is in the second state and the power source transitions from the OFF state to the ON state, the control unit reads the second shooting mode information from the memory, and activates the imaging device in the second shooting mode indicated by the read second shooting mode information.

According to a second aspect of the present invention, in the first aspect, an imaging device may be the imaging device that is activated in any one of a plurality of shooting modes including the first shooting mode, the second shooting mode, and a third shooting mode different from both the first shooting mode and the second shooting mode. The shooting operation switch may be in any one of a plurality of states including the first state, the second state, and a third state, and receive an instruction to autofocus to the imaging module in the third state after the imaging device is activated. The memory may further store third shooting mode information indicating the third shooting mode. The control unit may further read the third shooting mode information from the memory, and activate the imaging device in the third shooting mode indicated by the read third shooting mode information when the shooting operation switch is in the third state and the power source transitions from the OFF state to the ON state.

According to a third aspect of the present invention, in the second aspect, the third shooting mode may be a self-timer shooting mode. The second shooting mode may be a movie shooting mode.

According to a fourth aspect of the present invention, in the second aspect, the imaging device may further include a communication module configured to wirelessly receive the third shooting mode information. The memory may store the third shooting mode information wirelessly received through the communication module.

According to a fifth aspect of the present invention, in the second aspect, the memory may further store operation information indicating an operation according to a state of the shooting operation switch when the imaging device is activated in the third shooting mode. The control unit may further determine the state of the shooting operation switch directly after the imaging module first enters an imaging-enabled state, read the operation information from the memory, and execute the operation that is indicated by the read operation information and corresponds to the determined state when the shooting operation switch is in the third state and the power source transitions from the OFF state to the ON state.

According to a sixth aspect of the present invention, in the fifth aspect, the imaging device may further include a communication module configured to wirelessly receive the third shooting mode information and the operation information. The memory may store the third shooting mode information and the operation information wirelessly received through the communication module.

According to a seventh aspect of the present invention, in the first aspect, the imaging device may further include a communication module configured to wirelessly receive the second shooting mode information. The memory may store the second shooting mode information wirelessly received through the communication module.

According to an eighth aspect of the present invention, in the first aspect, the memory may further store operation information indicating an operation according to a state of the shooting operation switch when the imaging device is activated in the second shooting mode. The control unit may further determine a state of the shooting operation switch directly after the imaging module first enters an imaging-enabled state, read the operation information from the memory, and execute the operation that is indicated by the read operation information and corresponds to the determined state when the shooting operation switch is in the second state and the power source transitions from the OFF state to the ON state.

According to a ninth aspect of the present invention, in the eighth aspect, the imaging device may further include a communication module configured to wirelessly receive the second shooting mode information and the operation information. The memory may store the second shooting mode information and the operation information wirelessly received through the communication module.

According to a tenth aspect of the present invention, an imaging system is an imaging system including an imaging device configured to be activated in any one of a plurality of shooting modes including a first shooting mode and a second shooting mode different from the first shooting mode and a control device, wherein the imaging device includes a power operation switch configured to receive an operation of turning on a power source of the imaging device, a shooting operation switch configured to be in any one of a plurality of states including a first state and a second state, not to receive a shooting instruction operation in the first state, and to receive the shooting instruction operation in the second state after the imaging device is activated, an imaging module configured to perform imaging when the power source is turned on and the shooting operation switch is in the second state, a first communication module configured to wirelessly receive second shooting mode information indicating the second shooting mode, a memory configured to store first shooting mode information indicating the first shooting mode and the second shooting mode information wirelessly received through the first communication module, and a control unit configured to activate the imaging device, wherein, when the shooting operation switch is in the first state during the power source transitions from an OFF state to an ON state, the control unit reads the first shooting mode information from the memory, and activates the imaging device in the first shooting mode indicated by the read first shooting mode information, and when the shooting operation switch is in the second state and the power source transitions from the OFF state to the ON state, the control unit reads the second shooting mode information from the memory, and activates the imaging device in the second shooting mode indicated by the read second shooting mode information, and the control device includes a second communication module configured to wirelessly transmit the second shooting mode information.

According to an eleventh aspect of the present invention, a method of activating an imaging device is a method of activating an imaging device that is activated in any one of a plurality of shooting modes including a first shooting mode and a second shooting mode different from the first shooting mode, the imaging device includes a power operation switch configured to receive an operation of turning on a power source of the imaging device, a shooting operation switch configured to be in any one of a plurality of states including a first state and a second state, not to receive a shooting instruction operation in the first state, and to receive the shooting instruction operation in the second state after the imaging device is activated, an imaging module configured to perform imaging when the power source is turned on and the shooting operation switch is in the second state, and a memory configured to store first shooting mode information indicating the first shooting mode and second shooting mode information indicating the second shooting mode, and the method of activating the imaging device includes a first step of receiving an operation of turning on a power source of the imaging device through the power operation switch, and a second step of activating the imaging device, wherein, when the shooting operation switch is in the first state during the power source transitions from an OFF state to an ON state, the first shooting mode information is read from the memory, and the imaging device is activated in the first shooting mode indicated by the read first shooting mode information, and when the shooting operation switch is in the second state and the power source transitions from the OFF state to the ON state, the second shooting mode information is read from the memory, and the imaging device is activated in the second shooting mode indicated by the read second shooting mode information.

According to a twelfth aspect of the present invention, a computer readable recording medium storing a program is a computer readable recording medium storing a program causing a computer of an imaging device to execute a first step and a second step, the imaging device is activated in any one of a plurality of shooting modes including a first shooting mode and a second shooting mode different from the first shooting mode, and the imaging device includes a power operation switch configured to receive an operation of turning on a power source of the imaging device, a shooting operation switch configured to be in any one of a plurality of states including a first state and a second state, not to receive a shooting instruction operation in the first state, and to receive the shooting instruction operation in the second state after the imaging device is activated, an imaging module configured to perform imaging when the power source is turned on and the shooting operation switch is in the second state, and a memory configured to store first shooting mode information indicating the first shooting mode and second shooting mode information indicating the second shooting mode, wherein, in the first step, an operation of turning on a power source of the imaging device is received through the power operation switch, and in the second step, when the shooting operation switch is in the first state during the power source transitions from an OFF state to an ON state, the first shooting mode information is read from the memory, and the imaging device is activated in the first shooting mode indicated by the read first shooting mode information, and when the shooting operation switch is in the second state and the power source transitions from the OFF state to the ON state, the second shooting mode information is read from the memory, and the imaging device is activated in the second shooting mode indicated by the read second shooting mode information.

BRIEF DESCRIPTION OF DRAWINGS

FIG. 7 is a reference diagram showing first shooting mode information, second shooting mode information, and third shooting mode information according to Embodiment 2 of the present invention.

DETAILED DESCRIPTION OF THE INVENTION

Hereinafter, embodiments of the present invention will be described with reference to the appended drawings.

First Embodiment

Figure 1:
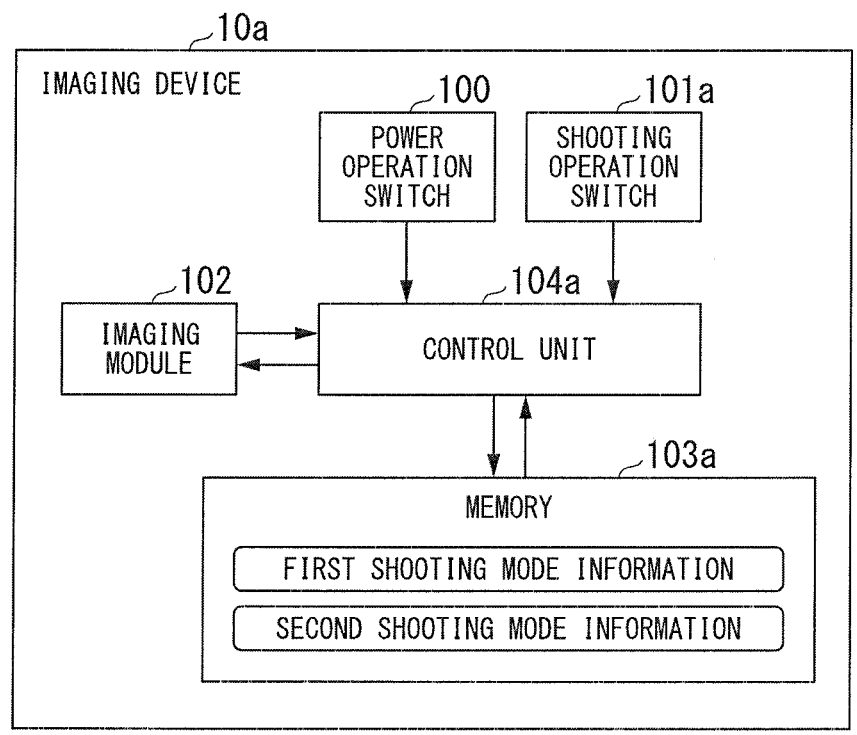
FIG. 1 is a block diagram showing a constitution of an imaging device according to Embodiment 1 of the present invention.

FIG. 1 shows a constitution of an imaging device 10a according to Embodiment 1 of the present invention. As shown in FIG. 1, an imaging device 10a includes a power operation switch 100, a shooting operation switch 101a, an imaging module 102, a memory 103a, and a control unit 104a. A power source of the imaging device 10a is not shown. The power source of the imaging device 10a may be removable from the imaging device 10a.

The imaging device 10a is activated in any one of a plurality of shooting modes including a first shooting mode and a second shooting mode different from the first shooting mode. For example, the first shooting mode is normal imaging (still image imaging). For example, the second shooting mode is self-timer shooting. A shooting mode settable in the imaging device 10a may include a shooting mode that is different from both of the first shooting mode and the second shooting mode.

The power operation switch 100 receives an operation of turning on the power source of the imaging device 10a. The power operation switch 100 may further receive an operation of turning off the power source of the imaging device 10a. For example, when the power operation switch 100 is in contact with a part of a body of the user, the power operation switch 100 receives an operation from the user. Upon receiving an operation, the power operation switch 100 outputs a signal according to the operation to the control unit 104a. The shape and structure of the power operation switch 100 are arbitrary. For example, the power operation switch 100 is a power button.

The shooting operation switch 101a enters any one of a plurality of states including a first state and a second state. In other words, the shooting operation switch 101a can switch a plurality of states including a first state and a second state. After the imaging device 10a is activated, when the shooting operation switch 101a is in the first state, a shooting instruction operation is not received. After the imaging device 10a is activated, when the shooting operation switch 101a is in the second state, a shooting instruction operation is received. The state of the shooting operation switch 101a may include a state different from both the first state and the second state. When the shooting operation switch 101a is in contact with a part of the body of the user, the shooting operation switch 101a receives an operation from the user. Upon receiving the operation, the shooting operation switch 101a outputs a signal according to the operation to the control unit 104a. The shape and structure of the shooting operation switch 101a are arbitrary. For example, the shooting operation switch 101a is a shutter button.

The imaging module 102 performs imaging when the power source is turned on and the shooting operation switch is in the second state. The imaging module 102 includes an imaging sensor. The imaging module 102 performs imaging according to a shooting mode. For example, in the normal imaging, when the shooting operation switch 101a enters the second state, the imaging module 102 performs imaging of a still image. For example, in the self-timer shooting, when a certain period of time elapses after the shooting operation switch 101a enters the second state, the imaging module 102 performs imaging of a still image. The imaging module 102 generates an image (image data) by imaging. The generated image is output to the control unit 104a The generated image may be recorded in a recording medium. Alternatively, the generated image may be output to another device. Alternatively, when the imaging device 10a includes a display module, the generated image may be displayed on the display module.

The memory 103a stores first shooting mode information indicating the first shooting mode and second shooting mode information indicating the second shooting mode. The memory 103a is a volatile or non-volatile recording medium. For example, the first shooting mode information includes a first control parameter used to activate the imaging device 10a in the first shooting mode. For example, the first control parameter includes a first imaging parameter used when the imaging module 102 performs imaging in the first shooting mode. For example, the second shooting mode information includes a second control parameter used to activate the imaging device 10a in the second shooting mode. For example, the second control parameter includes a second imaging parameter used when the imaging module 102 performs imaging in the second shooting mode.

The control unit 104a activates the imaging device 10a In other words, when the shooting operation switch 101a is in the first state, and the power source transitions the OFF state to the ON state, the control unit 104a reads the first shooting mode information from the memory 103a, and activates the imaging device 10a in the first shooting mode indicated by the read first shooting mode information. Further, when the shooting operation switch 101a is in the second state, and the power source transitions from the OFF state to the ON state, the control unit 104a reads the second shooting mode information from the memory 103a, and activates the imaging device 10a in the second shooting mode indicated by the read second shooting mode information. The control unit 104a sets an imaging parameter according to a shooting mode to the imaging module 102 when the imaging device 10a is activated.

For example, the control unit 104a reads a program including a command specifying an operation of the control unit 104a, and executes the read program. The program may be provided by a "computer readable recording medium" such as a flash memory. Further, the program may be transmitted from a computer including a storage device storing the program to the imaging device 10a via a transmission medium or transmission waves of a transmission medium. Here, the "transmission medium" transmitting the program refers to a medium having a function of transmitting information such as a network (a communication network) such as the Internet or a communication line (a communication wire) such as a telephone line. Further, the program may implement some functions among the above-described functions. In addition, the program may be a so-called differential file (a differential program) capable of implementing the above-described functions in combination with a program previously stored in a computer system.

Figure 2:
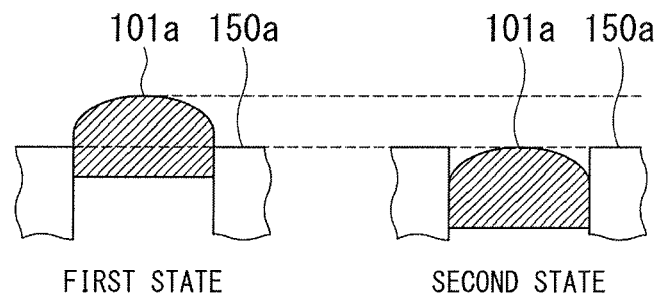
FIG. 2 is a cross-sectional diagram of a shooting operation switch according to Embodiment 1 of the present invention.

FIG. 2 shows the state of the shooting operation switch 101a FIG. 2 shows a cross section of the shooting operation switch 101a. An example in which the shooting operation switch 101a is configured as a button is shown in FIG. 2. The shooting operation switch 101a is arranged in an opening formed on a surface 150a of a housing of the imaging device 10a. When the shooting operation switch 101a is not pushed, the shooting operation switch 101a is in the first state. When the shooting operation switch 101a is pushed, the shooting operation switch 101a moves toward the inside of the imaging device 10a. When a position of an upper end of the shooting operation switch 101a is substantially at the same level of the surface 150a of the housing of the imaging device 10a, the shooting operation switch 101a is regarded as being in the second state. For example, when the state of the shooting operation switch 101a is between the first state and the second state shown in FIG. 2, the state of the shooting operation switch 101a is regarded to be in the first state.

Figure 3:
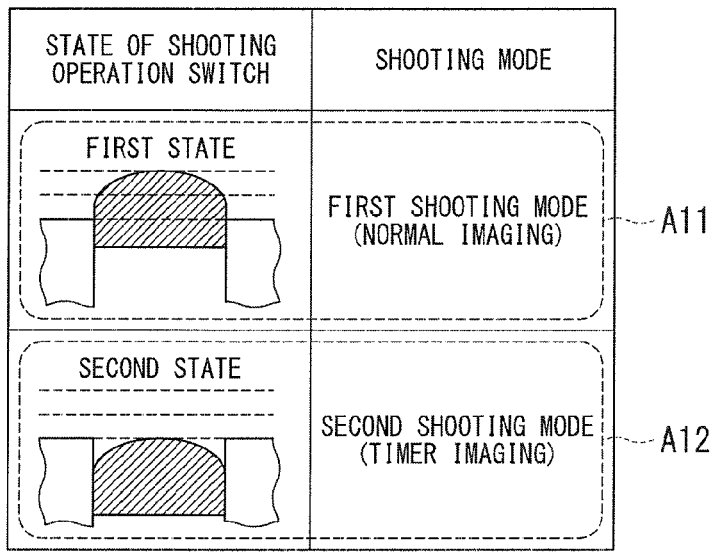
FIG. 3 is a reference diagram showing first shooting mode information and second shooting mode information according to Embodiment 1 of the present invention.

FIG. 3 shows first shooting mode information A11 and second shooting mode information A12 in Embodiment 1. The first shooting mode information A11 and the second shooting mode information A12 include a combination of information indicating the state of the shooting operation switch 101a and information indicating a shooting mode. The first shooting mode information A11 includes a combination of information indicating the first state and the information indicating the first shooting mode. The second shooting mode information A12 includes a combination of information indicating the second state and information indicating the second shooting mode. For example, the first shooting mode is the normal imaging, and the second shooting mode is the self-timer shooting.

Figure 4:
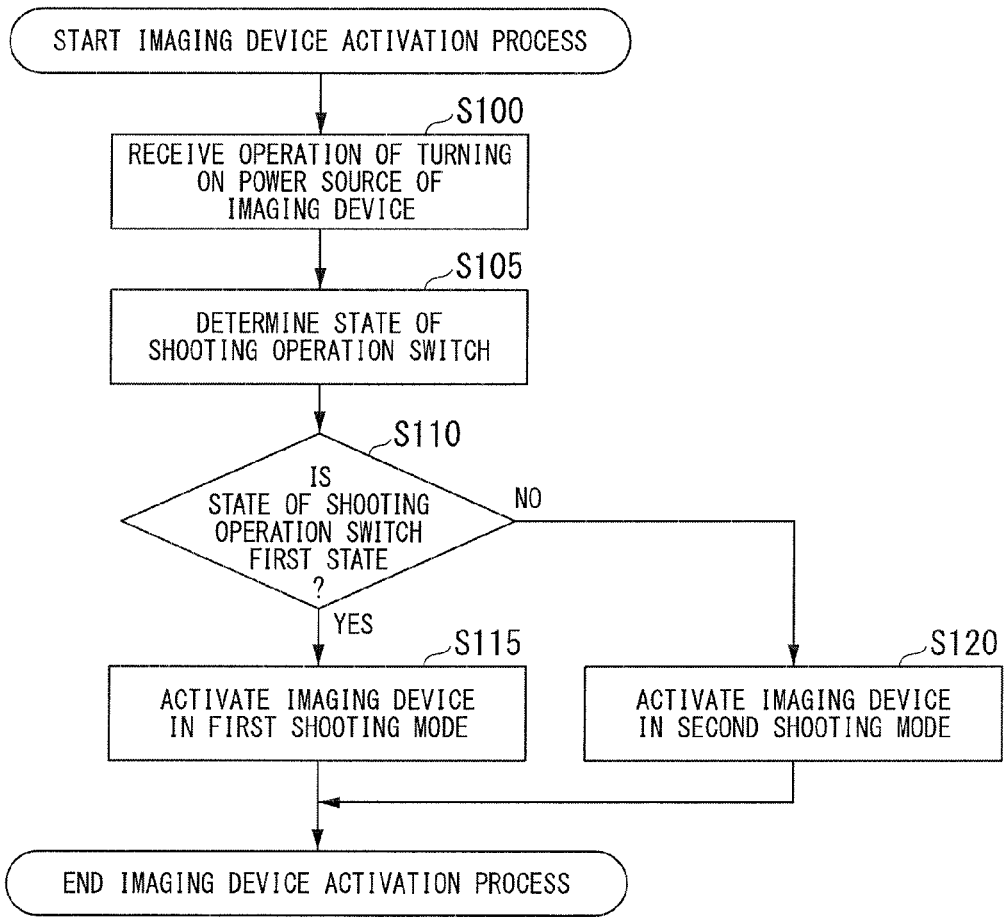
FIG. 4 is a flowchart showing a procedure of an imaging device activation process in Embodiment 1 of the present invention.

FIG. 4 shows a procedure of a process of activating the imaging device 10a The process of activating the imaging device 10a will be described with reference to FIG. 4.

The power operation switch 100 receives an operation of turning on the power source of the imaging device 10a (step S100). Thus, the power source of the imaging device 10a transitions from the OFF state to the ON state.

After the power source of the imaging device 10a is turned on, the control unit 104a determines the state of the shooting operation switch 101a (step S105). After the state of the shooting operation switch 101a is determined, the control unit 104a determines whether or not the state of the shooting operation switch 101a determined in step S105 is the first state (step S110).

When the state of the shooting operation switch 101a is the first state, the control unit 104a reads the first shooting mode information from the memory 103a, and activates the imaging device 10a in the first shooting mode indicated by the read first shooting mode information (step S115). For example, in step S115, the control unit 104a reads the first shooting mode information A11 including the information indicating the first state from the memory 103a The control unit 104a activates the imaging device 10a in the first shooting mode indicated by information associated with the information indicating the first state in the first shooting mode information A11.

When the state of the shooting operation switch 101a is not the first state, the control unit 104a reads the second shooting mode information from the memory 103a, and activates the imaging device 10a in the second shooting mode indicated by the read second shooting mode information (step S120). For example, in step S120, the control unit 104a reads the second shooting mode information A12 including the information indicating the second state from the memory 103a. The control unit 104a activates the imaging device 10a in the second shooting mode indicated by information associated with the information indicating the second state in the second shooting mode information A12.

After the above process is performed, the process of activating the imaging device 10a ends. After the process of activating the imaging device 10a ends, when the state of the shooting operation switch 101a becomes the second state, imaging according to a shooting mode is performed.

According to Embodiment 1, an imaging device 10a is activated in any one of a plurality of shooting modes including a first shooting mode and a second shooting mode different from the first shooting mode, and includes a power operation switch 100 configured to receive an operation of turning on a power source of the imaging device 10a, a shooting operation switch 101a configured to be in any one of a plurality of states including a first state and a second state, not to receive a shooting instruction operation in the first state and to receive the shooting instruction operation in the second state after the imaging device 10a is activated, an imaging module 102 configured to perform imaging when the power source is turned on and the shooting operation switch 101a is in the second state, a memory 103a configured to store first shooting mode information indicating the first shooting mode and second shooting mode information indicating the second shooting mode, and a control unit 104a configured to activate the imaging device 10a. When the shooting operation switch 101a is in the first state and the power source transitions the OFF state to the ON state, the control unit 104a reads the first shooting mode information from the memory 103a, and activates the imaging device 10a in the first shooting mode indicated by the read first shooting mode information. When the shooting operation switch 101a is in the second state, and the power source transitions from the OFF state to the ON state, the control unit 104a reads the second shooting mode information from the memory 103a, and activates the imaging device 10a in the second shooting mode indicated by the read second shooting mode information.

Further, according to Embodiment 1, a method of activating an imaging device 10a that is activated in any one of a plurality of shooting modes including a first shooting mode and a second shooting mode different from the first shooting mode is configured. The method of activating the imaging device 10a includes a first step (step S100) of receiving an operation of turning on a power source of the imaging device 10a through a power operation switch 100 and a second step (steps S115 and S120) of activating the imaging device 10a In the second step (step S115), when the shooting operation switch 101a is in the first state, and the power source transitions the OFF state to the ON state, the first shooting mode information is read from a memory 103a, and the imaging device 10a is activated in the first shooting mode indicated by the read first shooting mode information. Alternatively, in the second step (step S120), when the shooting operation switch 101a is in the second state, and the power source transitions from the OFF state to the ON state, the second shooting mode information is read from the memory 103a, and the imaging device 10a is activated in the second shooting mode indicated by the read second shooting mode information.

Further, according to Embodiment 1, a program causing a computer of an imaging device 10a to execute a first step (step S100) and a second step (steps S115 and S120) is configured, and the imaging device 10a is activated in any one of a plurality of shooting modes including a first shooting mode and a second shooting mode different from the first shooting mode.

In Embodiment 1, the imaging device 10a is activated in any one of the plurality of shooting modes including the first shooting mode and the second shooting mode according to the state of the shooting operation switch 101a when the state of the power source transitions from the OFF state to the ON state. Thus, it is possible to set a shooting mode when the imaging device 10a is activated.

Even when the imaging device 10a includes a limited user interface, it is possible to set a shooting mode by an operation of the shooting operation switch 101a. The user can easily select a shooting mode by the operation of the shooting operation switch 101a. Further, since the shooting mode is set at the same time as when the imaging device 10a is activated, a standby period of time until imaging can be performed in the selected shooting mode is reduced.

Second Embodiment

Figure 5:
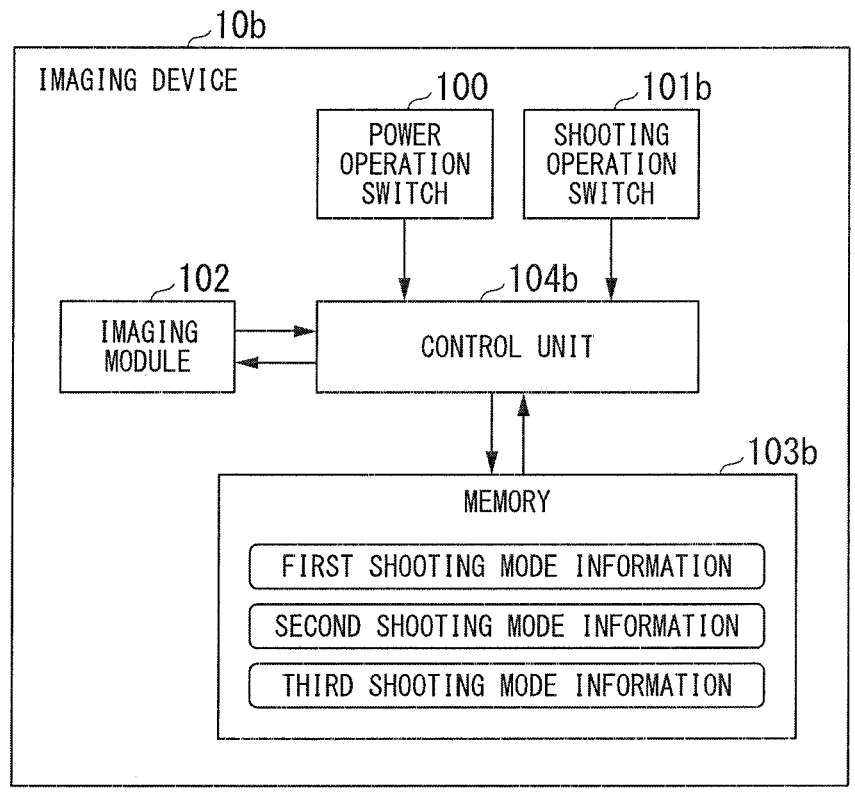
FIG. 5 is a block diagram showing a constitution of an imaging device according to Embodiment 2 of the present invention.

FIG. 5 shows a constitution of an imaging device 10b according to Embodiment 2 of the present invention. As shown in FIG. 5, the imaging device 10b includes a power operation switch 100, a shooting operation switch 101b, an imaging module 102, a memory 103b, and a control unit 104b. A power source of the imaging device 10b is not shown. The power source of the imaging device 10b may be removable from the imaging device 10b.

Differences between the constitution shown in FIG. 5 and the constitution shown in FIG. 1 will be described. The imaging device 10b is activated in any one of a plurality of shooting modes including a first shooting mode, a second shooting mode, and a third shooting mode different from the first shooting mode and the second shooting mode. For example, the first shooting mode is the normal imaging. For example, the second shooting mode is a movie imaging. For example, in the movie imaging, when the shooting operation switch 101b enters the second state, the imaging module 102 performs imaging of a movie. For example, the third shooting mode is the self-timer imaging. A shooting mode settable in the imaging device 10b may include a shooting mode that is different from all of the first shooting mode, the second shooting mode, and the third shooting mode.

The shooting operation switch 101b enters any one of a plurality of states including a first state, a second state, and a third state. In other words, the shooting operation switch 101b can switch a plurality of states including a first state, a second state, and a third state. After the imaging device 10b is activated in the mode such as the normal imaging, when the shooting operation switch 101b enters the third state, an instruction to autofocus for the imaging module 102 is received. The state of the shooting operation switch 101b may include a state different from all of the first state, the second state, and the third state. When the shooting operation switch 101b is in contact with a part of the body of the user, the shooting operation switch 101b receives an operation from the user. Upon receiving the operation, the shooting operation switch 101b outputs a signal according to the operation to the control unit 104b A shape and structure of the shooting operation switch 101b are arbitrary. For example, the shooting operation switch 101b is a shutter button.

The memory 103b stores the first shooting mode information, the second shooting mode information, and third shooting mode information indicating the third shooting mode. The memory 103b is a volatile or non-volatile recording medium. For example, the third shooting mode information includes a third control parameter used to activate the imaging device 10b in the third shooting mode. For example, the third control parameter includes a third imaging parameter used when the imaging module 102 performs imaging in the third shooting mode.

When the shooting operation switch 101b is in the first state or the second state and the power source transitions from the OFF state to the ON state, the control unit 104b performs the same process as the control unit 104a shown in FIG. 1. Further, when the shooting operation switch 101b is in the third state, and the power source transitions from the OFF state to the ON state, the control unit 104b reads the third shooting mode information from the memory 103b, and activates the imaging device 10b in the third shooting mode indicated by the read third shooting mode information. After the imaging device 10b is activated in the mode such as the normal imaging, when the shooting operation switch 101b receives the instruction to autofocus (that is, the shooting operation switch 101b enters the third state), the control unit 104b adjusts the focus of the imaging module 102.

For example, the control unit 104b reads a program including a command specifying an operation of the control unit 104b, and executes the read program. An implementation form of the program is the same as the implementation form of the program for implementing the function of the control unit 104a shown in FIG. 1.

Except this point, the constitution shown in FIG. 5 is the same as the constitution shown in FIG. 1.

Figure 6:
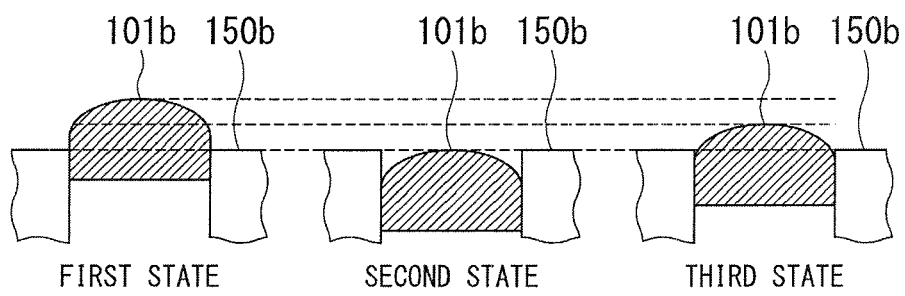
FIG. 6 is a cross-sectional diagram of a shooting operation switch according to Embodiment 2 of the present invention.

FIG. 6 shows the state of the shooting operation switch 101b FIG. 6 shows a cross section of the shooting operation switch 101b. An example in which the shooting operation switch 101b is configured as a button is shown in FIG. 6. The shooting operation switch 101b is arranged in an opening formed on a surface 150b of a housing of the imaging device 10b. When the shooting operation switch 101b is not pushed, the shooting operation switch 101b is in the first state. When the shooting operation switch 101b is pushed, the shooting operation switch 101b moves toward the inside of the imaging device 10b. When the position of an upper end of the shooting operation switch 101b is substantially at the same level of the surface 150b of the housing of the imaging device 10b, the shooting operation switch 101b is regarded as being in the second state. When a position of the shooting operation switch 101b is substantially at the middle between a position of an upper end in the first state and a position of an upper end in the second state, the state of the shooting operation switch 101a is regarded as being the third state.

For example, when the state of the shooting operation switch 101b is between the first state and the third state shown in FIG. 6, the state of the shooting operation switch 101b is regarded as being the first state. For example, when the state of the shooting operation switch 101b is between the third state and the second state shown in FIG. 6, the state of the shooting operation switch 101b is regarded as being the third state.

FIG. 7 shows first shooting mode information A21, second shooting mode information A22, and third shooting mode information A23 in Embodiment 2. The first shooting mode information A21 is the same as the first shooting mode information A11 of FIG. 3. The second shooting mode information A22 is the same as the second shooting mode information A12 of FIG. 3. Thus, a description of the first shooting mode information A21 and the second shooting mode information A22 is omitted.

The third shooting mode information A23 includes a combination of information indicating the state of the shooting operation switch 101b and information indicating a shooting mode. The third shooting mode information A23 includes a combination of information indicating the third state and information indicating the third shooting mode. For example, the first shooting mode is the normal imaging (still image imaging), the second shooting mode is the movie imaging, and the third shooting mode is the self-timer imaging.

Figure 8:
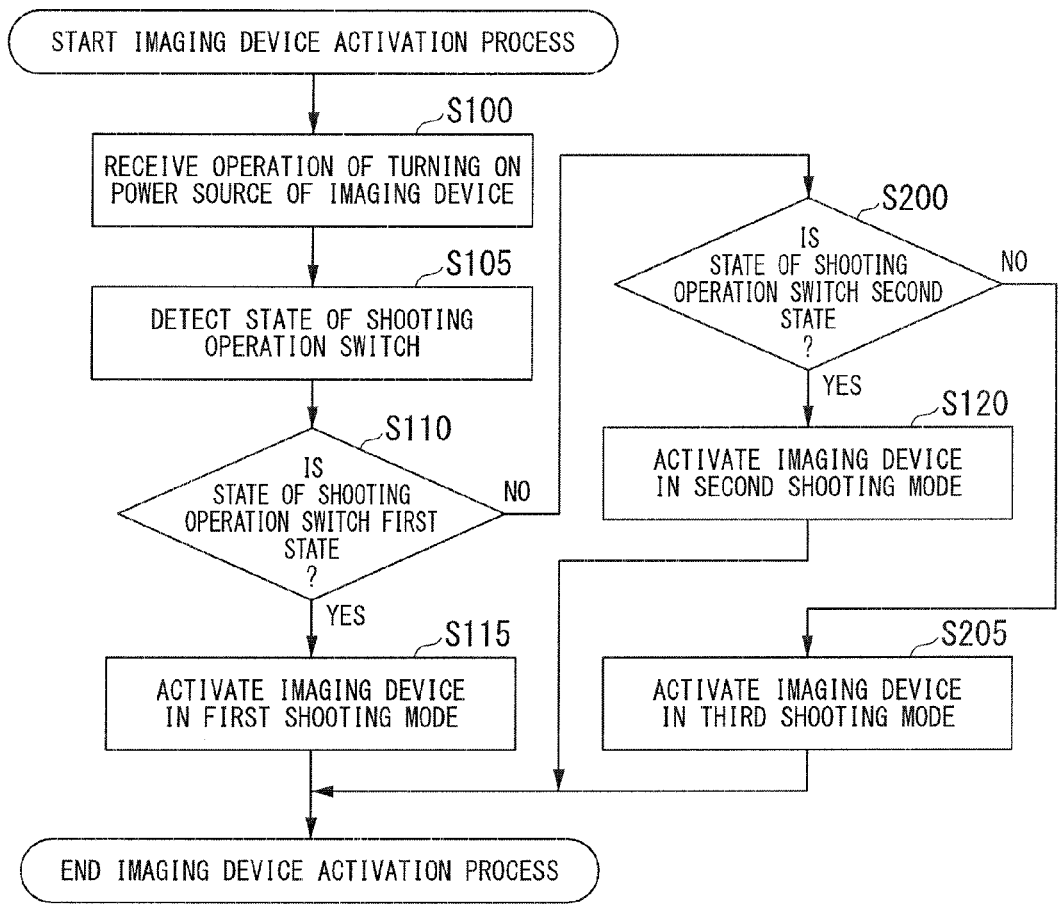
FIG. 8 is a flowchart showing a procedure of an imaging device activation process according to Embodiment 2 of the present invention.

FIG. 8 shows a procedure of a process of activating the imaging device 10b. The process of activating the imaging device 10b will be described with reference to FIG. 8. The process shown in FIG. 8 will be described focusing on differences with the process shown in FIG. 4.

When the state of the shooting operation switch 101b is determined not to be the first state in step S110, the control unit 104a determines whether or not the state of the shooting operation switch 101b determined in step S105 is the second state (step S200). When the state of the shooting operation switch 101b is the second state, the imaging device 10b is activated in the second shooting mode (step S120). This process is the same as the process of step S120 of FIG. 4.

When the state of the shooting operation switch 101b is not the second state, the state of the shooting operation switch 101b is the third state. The control unit 104b reads the third shooting mode information from the memory 103b, and activates the imaging device 10b in the third shooting mode indicated by the read third shooting mode information (step S205). For example, in step S205, the control unit 104b reads the third shooting mode information A23 including the information indicating the third state from the memory 103b The control unit 104b activates the imaging device 10b in the third shooting mode indicated by information associated with the information indicating the third state in the third shooting mode information A23.

Except this point, the process shown in FIG. 8 is the same as the process shown in FIG. 4.

In Embodiment 2, the imaging device 10b is activated in any one of a plurality of shooting modes including the first shooting mode, the second shooting mode, and the third shooting mode according to the state of the shooting operation switch 101b when the power source transitions from the OFF state to the ON state. Thus, it is possible to set the shooting mode when the imaging device 10b is activated.

Third Embodiment

Figure 9:
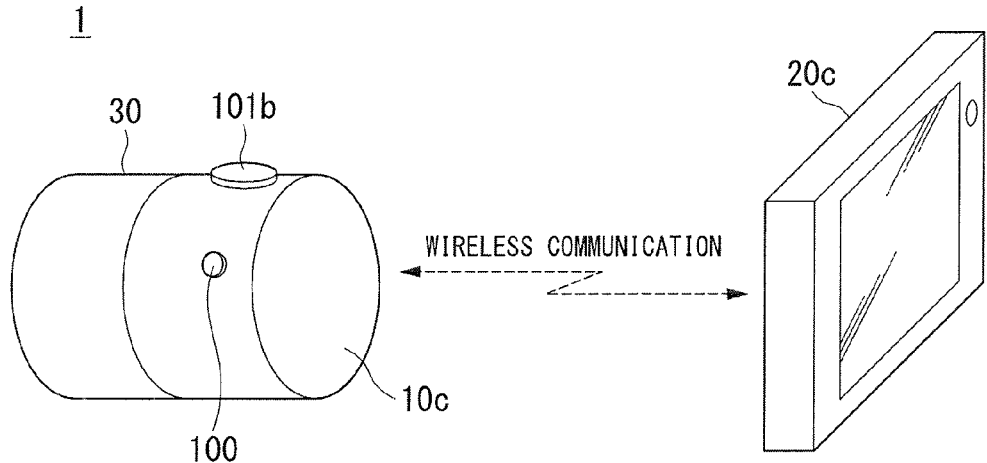
FIG. 9 is a constitution diagram showing an imaging system according to Embodiment 3 of the present invention.

FIG. 9 shows a constitution of an imaging system 1 according to Embodiment 3 of the present invention. As shown in FIG. 9, the imaging system 1 includes an imaging device 10c, a control device 20c, and a lens module 30.

A power operation switch 100 and a shooting operation switch 101b are arranged on the surface of an imaging device 10c A control device 20c performs wireless communication with the imaging device 10c. In Embodiment 3, the imaging device 10c updates the second shooting mode information or the third shooting mode information held in the imaging device 10c using the second shooting mode information or the third shooting mode information received from the control device 20c.

A lens module 30 includes a lens such as a focus lens or a zoom lens. Referring to FIG. 9, a lens module 30 is mounted in the imaging device 10c. The imaging device 10c and the lens module 30 may be removably mounted. The imaging device 10c may include a lens.

Figure 10:
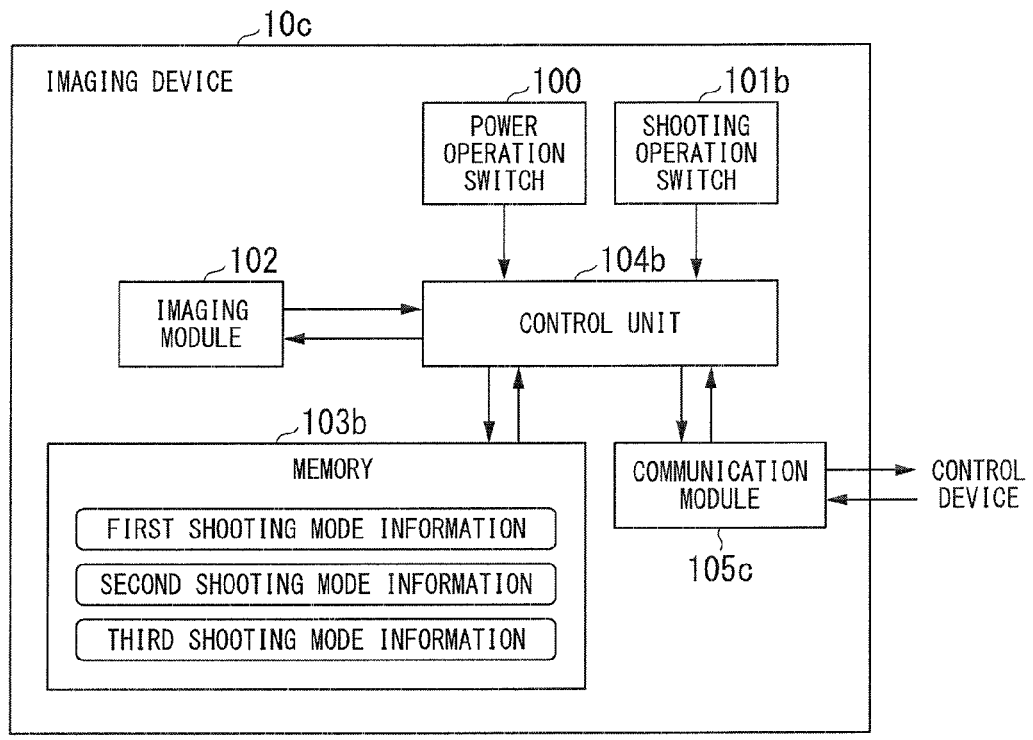
FIG. 10 is a block diagram showing a constitution of an imaging device according to Embodiment 3 of the present invention.

FIG. 10 shows a constitution of the imaging device 10c As shown in FIG. 10, the imaging device 10c includes the power operation switch 100, the shooting operation switch 101b, the imaging module 102, a memory 103b, a control unit 104b, and a communication module 105c (a first communication module) A power source of the imaging device 10c is not shown. The power source of the imaging device 10c may be removable from the imaging device 10c.

Differences between the constitution shown in FIG. 10 and the constitution shown in FIG. 5 will be described. The communication module 105c performs wireless communication with the control device 20c The communication module 105c wirelessly receives the second shooting mode information or the third shooting mode information from the control device 20c. The memory 103b stores the first shooting mode information, the second shooting mode information, and the third shooting mode information. Further, the memory 103b stores the second shooting mode information or the third shooting mode information wirelessly received through the communication module 105c.

Except this point, the constitution shown in FIG. 10 is the same as the constitution shown in FIG. 5.

Figure 11:
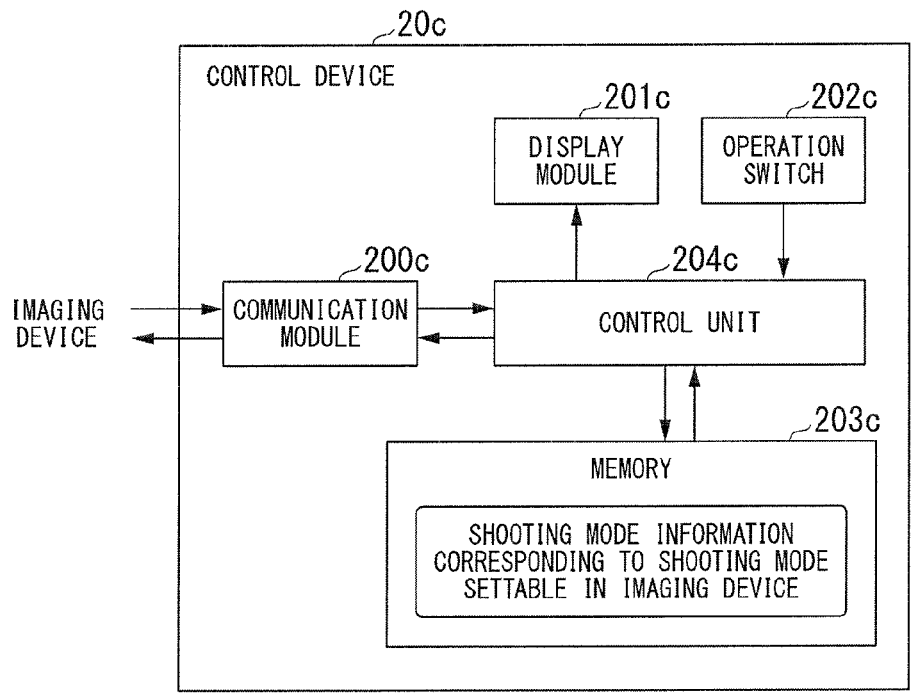
FIG. 11 is a block diagram showing a constitution of a control device according to Embodiment 3 of the present invention.

FIG. 11 shows a constitution of the control device 20c. As shown in FIG. 11, the control device 20c includes a communication module 200c (a second communication module), a display module 201c, an operation switch 202c, a memory 203c, and a control unit 204c. The control device according to one aspect of the present invention may not have a constitution other than a constitution supporting the communication module 200c.

The communication module 200c performs wireless communication with the imaging device 10c The communication module 200c wirelessly transmits the second shooting mode information or the third shooting mode information to the imaging device 10c.

The display module 201c displays one or more shooting modes based on one or more pieces of shooting mode information corresponding to one or more shooting modes settable in the imaging device 10c.

The operation switch 202c receives an operation of selecting any one of the shooting modes displayed by the display module 201c. For example, when the operation switch 202c is in contact with a part of the body of the user, the operation switch 202c receives an operation from the user. Upon receiving the operation, the operation switch 202c outputs a signal according to the operation to the control unit 204c. A shape and structure of the operation switch 202c are arbitrary. For example, the operation switch 202c is a touch panel.

The memory 203c stores the one or more pieces of shooting mode information corresponding to one or more shooting modes settable in the imaging device 10c The memory 203c is a volatile or non-volatile recording medium. For example, the one or more pieces of shooting mode information stored in the memory 203c correspond to one or more of the self-timer shooting mode, the movie shooting mode, a macro shooting mode, a consecutive shooting mode, and a dark shooting mode. For example, the one or more pieces of shooting mode information stored in the memory 203c include a control parameter used when the imaging device 10c is activated in a shooting mode corresponding to the corresponding shooting mode information. For example, the control parameter includes an imaging parameter used when the imaging module 102 performs imaging in the corresponding shooting mode. The one or more pieces of shooting mode information stored in the memory 203c are not associated with any of the first shooting mode, the second shooting mode, and the third shooting mode.

The control unit 204c reads the shooting mode information corresponding to the shooting mode selected by the user from the memory 203c The control unit 204c generates the second shooting mode information or the third shooting mode information based on the read shooting mode information.

The second shooting mode information or the third shooting mode information indicating the shooting mode selected by the user is stored in the memory 103b of the imaging device 10c Thus, the imaging device 10c can update the second shooting mode information and the third shooting mode information stored in the memory 103b to the information corresponding to the shooting mode selected by the user. In other words, in Embodiment 3, the second shooting mode information and the third shooting mode information can be customized.

A process of activating the imaging device 10c is the same as the process of activating the imaging device 10b shown in FIG. 8. Thus, the process of activating the imaging device 10c is omitted.

Figure 12:
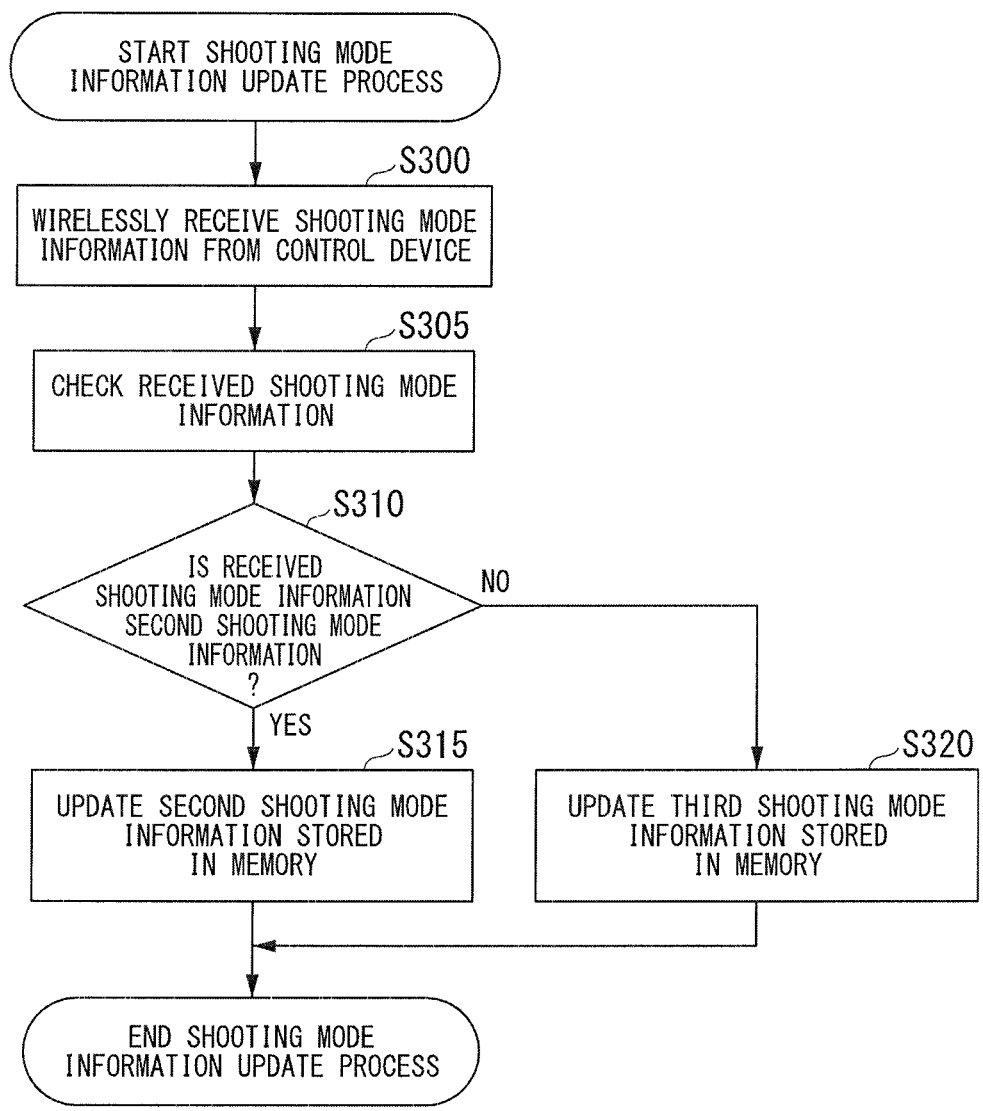
FIG. 12 is a flowchart showing a procedure of a shooting mode information update process according to Embodiment 3 of the present invention.

FIG. 12 shows a procedure of a shooting mode information update process performed by the imaging device 10c. The shooting mode information update process will be described with reference to FIG. 12.

After the imaging device 10c is activated and the imaging device 10c starts the shooting mode information update process, the communication module 105c wirelessly receives the shooting mode information from the control device 20c (step S300). After the shooting mode information is received, the control unit 104b checks the received shooting mode information (step S305).

After the received shooting mode information is checked, the control unit 104b determines whether or not the received shooting mode information is the second shooting mode information (step S310). For example, the information indicating the state of the shooting operation switch 101b is added to the received shooting mode information. When the information indicating the second state is added to the shooting mode information, the received shooting mode information can be determined to be the second shooting mode information. When the information indicating the third state is added to the shooting mode information, the received shooting mode information can be determined to be the third shooting mode information.

When the received shooting mode information is the second shooting mode information, the control unit 104b updates the second shooting mode information stored in the memory 103b by the received shooting mode information (step S315). As a result, the second shooting mode information stored in the memory 103b indicates the shooting mode selected by the user.

When the received shooting mode information is not the second shooting mode information, the received shooting mode information is the third shooting mode information. The control unit 104b updates the third shooting mode information stored in the memory 103b by the received shooting mode information (step S320). As a result, the third shooting mode information stored in the memory 103b indicates the shooting mode selected by the user.

After the above process is performed, the shooting mode information update process ends.

Figure 13:
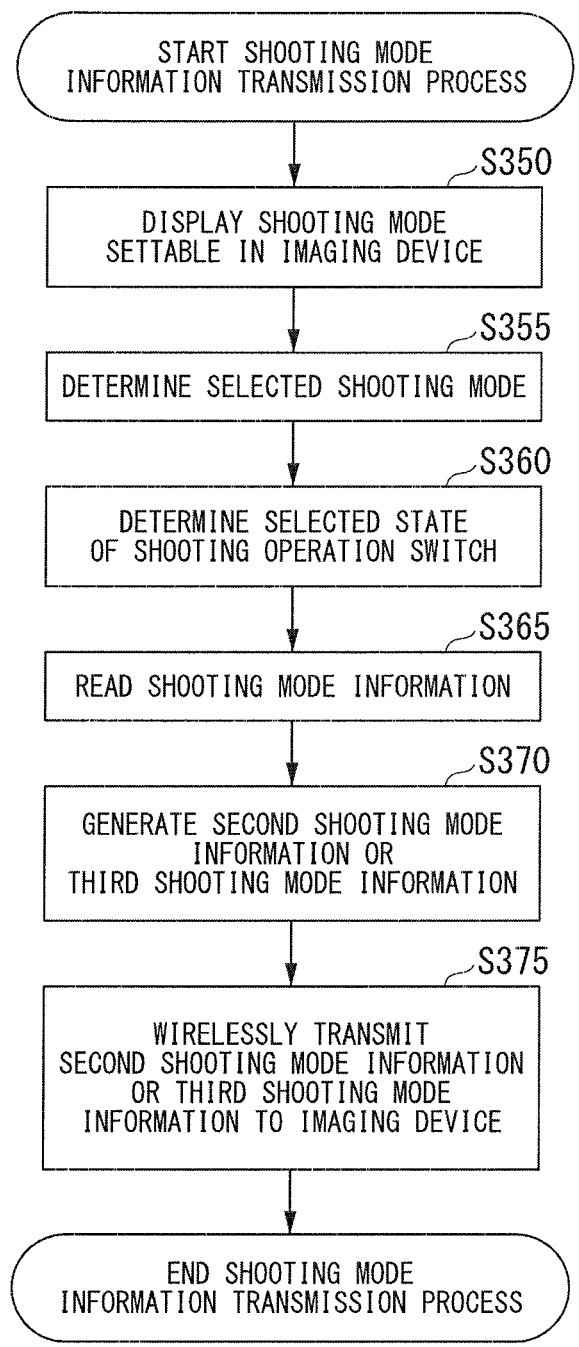
FIG. 13 is a flowchart showing a procedure of a shooting mode information transmission process according to Embodiment 3 of the present invention.

FIG. 13 shows a procedure of a shooting mode information transmission process performed by the control device 20c. The shooting mode information transmission process will be described with reference to FIG. 13.

The control unit 204c reads one or more pieces of shooting mode information corresponding to one or more shooting modes settable in the imaging device 10c from the memory 203c, and outputs the read shooting mode information to the display module 201c The display module 201c displays one or more shooting modes settable in the imaging device 10c based on the shooting mode information (step S350).

After the shooting mode is displayed, the operation switch 202c receives an operation of selecting a shooting mode. The control unit 204c determines the selected shooting mode (step S355). After the selected shooting mode is determined, the operation switch 202c receives an operation of selecting the state of the shooting operation switch 101b The control unit 204c determines the selected state of the shooting operation switch 101b (step S360).

After the selected state of the shooting operation switch 101b is determined, the control unit 204c reads the shooting mode information corresponding to the shooting mode determined in step S355 from the memory 203c (step S365). The control unit 204c generates the second shooting mode information or the third shooting mode information based on the read shooting mode information and the selected state of the shooting operation switch 101b (step S370). For example, when the second state is selected, the control unit 204c generates the second shooting mode information by adding the information indicating the second state to the read shooting mode information. Alternatively, when the third state is selected, the control unit 204c generates the third shooting mode information by adding the information indicating the third state to the read shooting mode information. The generated second shooting mode information or the third shooting mode information is output to the communication module 200c.

After the second shooting mode information or the third shooting mode information is generated, the communication module 200c wirelessly transmits the second shooting mode information or the third shooting mode information to the imaging device 10c (step S375).

After the above process is performed, the shooting mode information transmission process ends.

In the above description, it is possible to update both the second shooting mode information and the third shooting mode information held in the imaging device 10c However, it may be possible to update either of the second shooting mode information and the third shooting mode information held in the imaging device 10c. Further, through the same method, it may be possible to update the first shooting mode information held in the imaging device 10c.

According to Embodiment 3, an imaging system 1 including an imaging device 10c and a control device 20c is configured, and the imaging device 10c is activated in any one of a plurality of shooting modes including a first shooting mode and a second shooting mode different from the first shooting mode. The imaging device 10c includes the power operation switch 100, the shooting operation switch 101b, the imaging module 102, the communication module 105c (the first communication module), the memory 103b, and the control unit 104b. The control device 20c includes the communication module 200c (the second communication module).

In Embodiment 3, the second shooting mode information and the third shooting mode information can be updated to the information corresponding to the shooting mode selected by the user.

Fourth Embodiment

Figure 14:
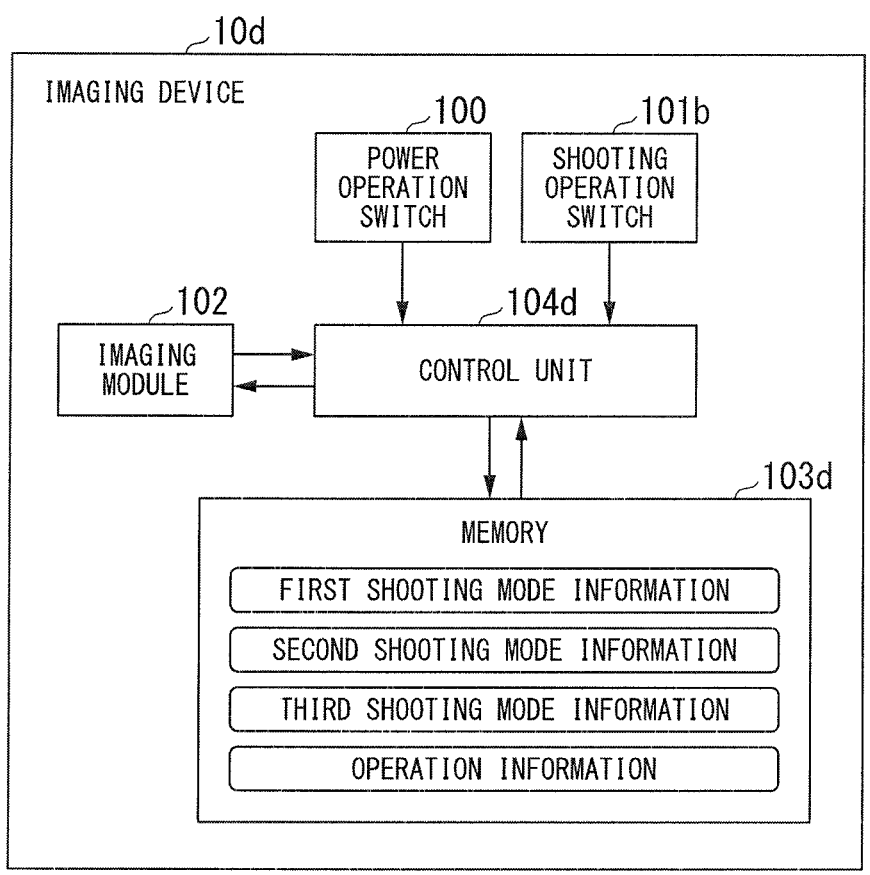
FIG. 14 is a block diagram showing a constitution of an imaging device according to Embodiment 4 of the present invention.

FIG. 14 shows a constitution of an imaging device 10d according to Embodiment 4 of the present invention. As shown in FIG. 14, the imaging device 10d includes a power operation switch 100, a shooting operation switch 101b, an imaging module 102, a memory 103d, and a control unit 104d. A power source of the imaging device 10d is not shown. The power source of the imaging device 10d may be removable from the imaging device 10d.

Differences between the constitution shown in FIG. 14 and the constitution shown in FIG. 5 will be described. The memory 103d stores the first shooting mode information, the second shooting mode information, and the third shooting mode information. The memory 103d further stores operation information indicating an operation according to the state of the shooting operation switch 101b when the imaging device 10d is activated in the second shooting mode or the third shooting mode. The operation indicated by the operation information is an operation related to imaging. The operation indicated by the operation information corresponds to either of execution of imaging according to a shooting mode and non-execution of imaging according to a shooting mode. Alternatively, the operation indicated by the operation information corresponds to execution of preprocessing of imaging. For example, the preprocessing of imaging is autofocusing.

When the shooting operation switch 101b is in any one of the first state, the second state, and the third state and the power source transitions from the OFF state to the ON state, the control unit 104d performs the same process as in the control unit 104b shown in FIG. 5. Further, when the shooting operation switch 101b is in the second state or the third state, and the power source transitions from the OFF state to the ON state, the control unit 104d determines the state of the shooting operation switch 101b directly after the imaging module 102 first enters an imaging-enabled state. Furthermore, the control unit 104d reads the operation information from the memory 103d, and executes an operation corresponding to the determined state, that is, the operation indicated by the read operation information.

For example, the control unit 104d reads a program including a command specifying an operation of the control unit 104d, and executes the read program. An implementation form of the program is the same as the implementation form of the program for implementing the function of the control unit 104a shown in FIG. 1.

In Embodiment 4, a period of time necessary for the process of activating the imaging device 10d is longer than a period of time necessary for the process of activating the imaging module 102. Thus, after the imaging module 102 enters the imaging-enabled state, the process of activating the imaging device 10d is completed. For example, when the imaging device 10d includes a communication module capable of performing wireless communication, the process of activating the imaging device 10d includes the process of activating the imaging module 102 and the process of activating the communication module. The process of activating the communication module includes a process of establishing a wireless communication connection with a device of a communication counterpart (for example, the control device 20c shown in FIG. 9). A period of time necessary for the process of activating the communication module is longer than a period of time necessary for the process of activating the imaging module 102. Thus, after the imaging module 102 enters the imaging-enabled state, the process of activating the communication module is completed. After the imaging module 102 enters the imaging-enabled state, before the process of activating the imaging device 10d is completed, the control unit 104d can perform an operation based on the operation information.

Except this point, the constitution shown in FIG. 14 is the same as the constitution shown in FIG. 5.

Figure 15:
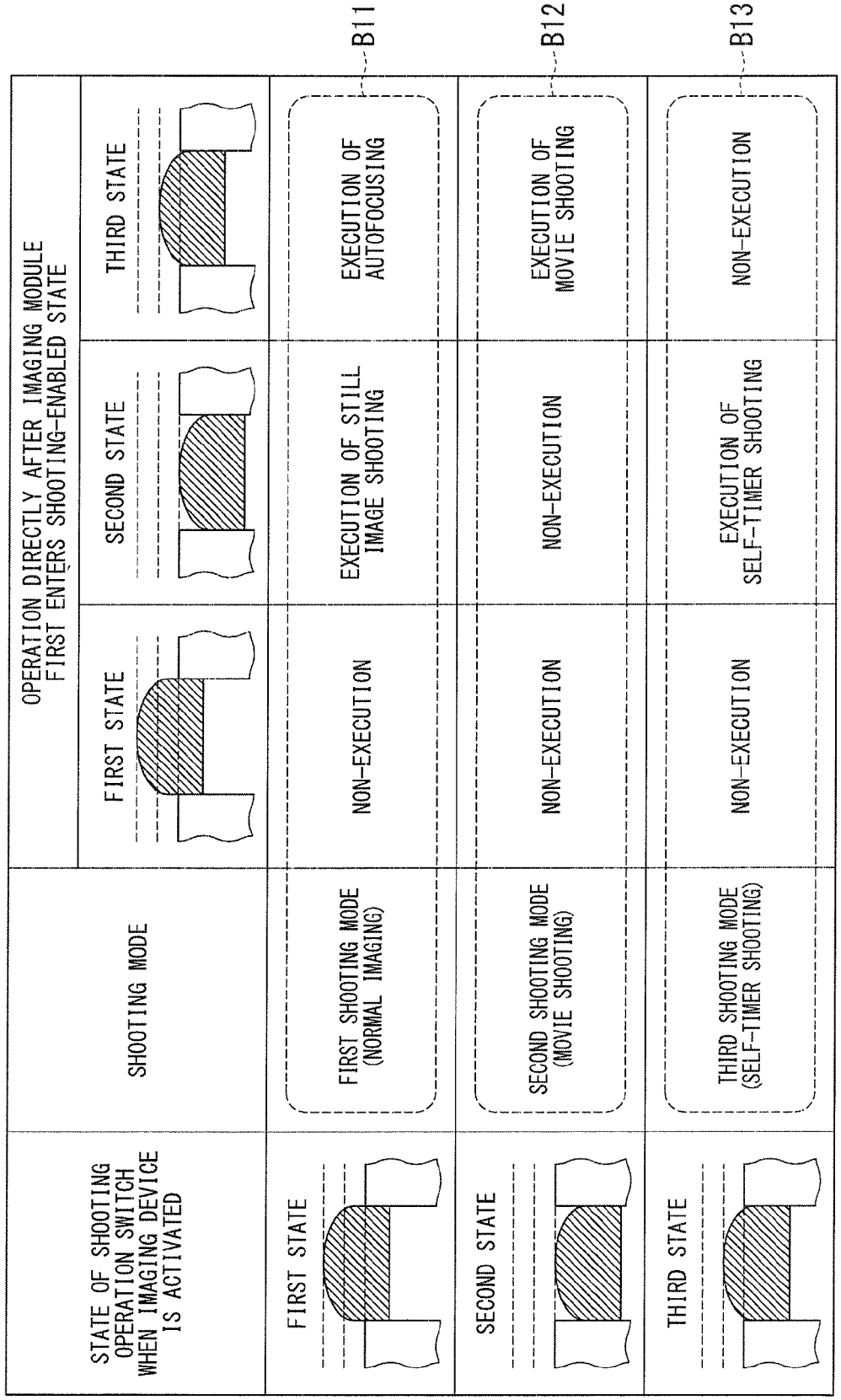
FIG. 15 is a reference diagram showing first operation information, second operation information, and third operation information according to Embodiment 4 of the present invention.

FIG. 15 shows first operation information B11, second operation information B12, and third operation information B13 in Embodiment 4 The first operation information B11, the second operation information B12, and the third operation information B13 include a combination of information indicating a shooting mode directly after activation and information indicating an operation directly after the imaging module 102 first enters the imaging-enabled state. In the following description, a timing directly after the imaging module 102 first enters the imaging-enabled state is referred to as an "initial timing." An operation at the initial timing is decided according to the state of the shooting operation switch 101b at the initial timing. In FIG. 15, for reference, the states of the shooting operation switch 101b when the imaging device 10d is activated corresponding to the first operation information B11, the second operation information B12, and the third operation information B13 are shown.

The first operation information B11 includes a combination of the information indicating the first shooting mode and the information indicating an operation according to the state of the shooting operation switch 101b at the initial timing. The second operation information B12 includes a combination of the information indicating the second shooting mode and the information indicating an operation according to the state of the shooting operation switch 101b at the initial timing. The third operation information B13 includes a combination of the information indicating the third shooting mode and the information indicating an operation according to the state of the shooting operation switch 101b at the initial timing. For example, the first shooting mode is a mode of normal imaging (still image imaging), the second shooting mode is a mode of movie imaging, and the third shooting mode is a mode of the self-timer imaging.

The first operation information B11 corresponds to the first shooting mode, that is, the normal imaging. In the first operation information B11, an operation corresponding to the first state of the shooting operation switch 101b at the initial timing is the non-execution. When the operation is the non-execution, imaging is not performed at the initial timing. In the first operation information B11, an operation corresponding to the second state of the shooting operation switch 101b at the initial timing is execution of still image imaging. Thus, when the imaging device 10d is activated in the first shooting mode and the state of the shooting operation switch 101b at the initial timing is the second state, the control unit 104d executes the still image imaging. In the first operation information B11, an operation corresponding to the third state of the shooting operation switch 101b at the initial timing is execution of autofocusing. Thus, when the imaging device 10d is activated in the first shooting mode and the state of the shooting operation switch 101b at the initial timing is the third state, the control unit 104d adjusts the focus of the imaging module 102.

The second operation information B12 corresponds to the second shooting mode, that is, the movie imaging. In the second operation information B12, an operation corresponding to the first state and the second state of the shooting operation switch 101b at the initial timing is non-execution. In the second operation information B12, the operation corresponding to the third state of the shooting operation switch 101b at the initial timing is execution of the movie imaging. Thus, when the imaging device 10d is activated in the second shooting mode, and the state of the shooting operation switch 101b at the initial timing is the third state, the control unit 104d executes the movie imaging.

The third operation information B13 corresponds to the third shooting mode, that is, the self-timer shooting mode. In the third operation information B13, an operation corresponding to the first state and the third state of the shooting operation switch 101b at the initial timing is non-execution. In the third operation information B13, the operation corresponding to the second state of the shooting operation switch 101b at the initial timing is execution of the self-timer shooting. Thus, when the imaging device 10d is activated in the third shooting mode and the state of the shooting operation switch 101b at the initial timing is the second state, the control unit 104d executes the self-timer shooting.

In all of the first operation information B11, the second operation information B12, and the third operation information B13, an operation corresponding to the same state as the state of the shooting operation switch 101b directly after the power source of the imaging device 10d is turned on is non-execution. In all of the first operation information B11, the second operation information B12, and the third operation information B13, an operation corresponding to a state different from the state of the shooting operation switch 101b directly after the power source of the imaging device 10d is turned on is an operation related to imaging corresponding to a shooting mode.

Figure 16:
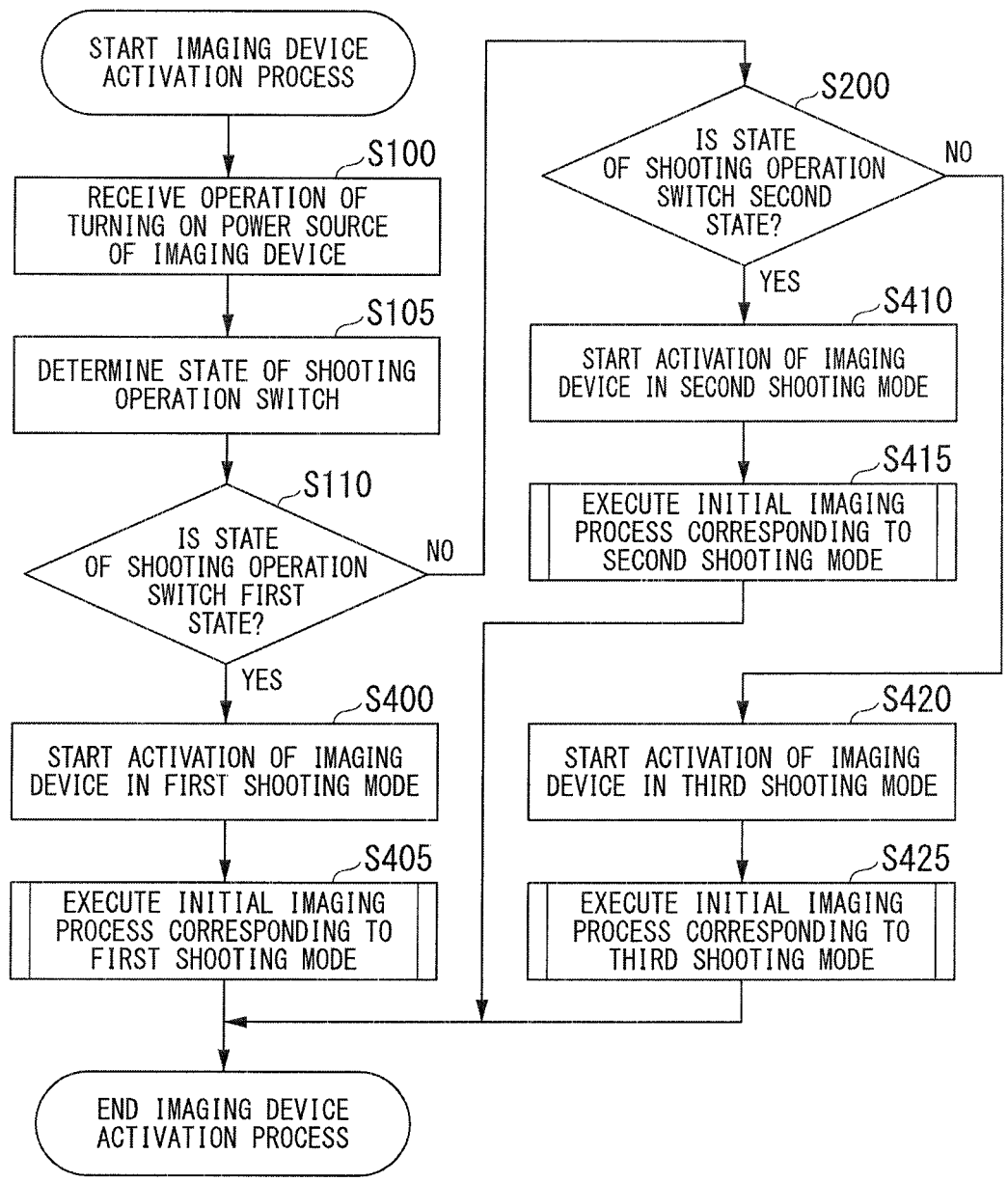
FIG. 16 is a flowchart showing a procedure of an imaging device activation process according to Embodiment 4 of the present invention.

FIG. 16 shows a procedure of the process of activating the imaging device 10d. The process of activating the imaging device 10d will be described with reference to FIG. 16.

In step S100, when the state of the shooting operation switch 101b is the first state, the control unit 104d reads the first shooting mode information from the memory 103d, and starts activation of the imaging device 10d in the first shooting mode indicated by the read first shooting mode information (step S400). After the activation of the imaging device 10d starts, the control unit 104d executes an initial imaging process corresponding to the first shooting mode (step S405).

In step S200, when the state of the shooting operation switch 101b is the second state, the control unit 104d reads the second shooting mode information from the memory 103d, and starts activation of the imaging device 10d in the second shooting mode indicated by the read second shooting mode information (step S410). After the activation of the imaging device 10d starts, the control unit 104d executes an initial imaging process corresponding to the second shooting mode (step S415).

In step S200, when the state of the shooting operation switch 101b is not the second state, the state of the shooting operation switch 101b is the third state. The control unit 104d reads the third shooting mode information from the memory 103d, and starts activation of the imaging device 10d in the third shooting mode indicated by the read third shooting mode information (step S420). After the activation of the imaging device 10d starts, the control unit 104d executes an initial imaging process corresponding to the third shooting mode (step S425).

After the above process is performed, the initial imaging process ends.

Figure 17:
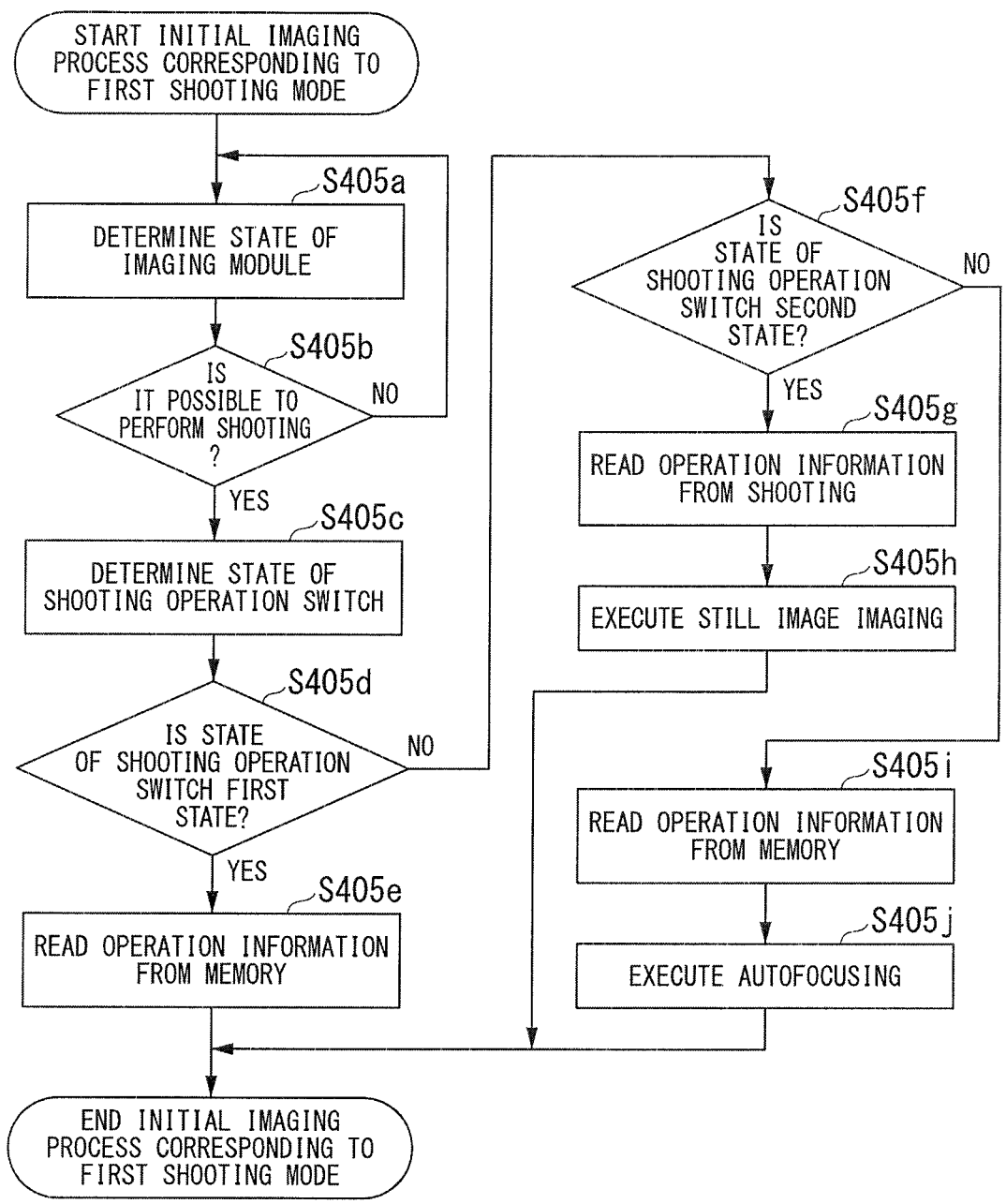
FIG. 17 is a flowchart showing a procedure of an initial imaging process according to Embodiment 4 of the present invention.

FIG. 17 shows a procedure of the initial imaging process (step S405) corresponding to the first shooting mode. The initial imaging process corresponding to the first shooting mode will be described with reference to FIG. 17.

The control unit 104d determines the state of the imaging module 102 (step S405a). After the state of the imaging module 102 is determined, the control unit 104d determines whether or not it is possible to perform imaging based on the state of the imaging module 102 determined in step S405a (step S405b). When it is difficult to perform imaging, the process of step S405a is performed again.

When it is possible to perform imaging, that is, when the imaging module 102 is in the imaging-enabled state, the control unit 104d determines the state of the shooting operation switch 101b (step S405c). After the state of the shooting operation switch 101b is determined, the control unit 104d determines whether or not the state of the shooting operation switch 101b determined in step S405c is the first state (step S405d).

When the state of the shooting operation switch 101b is the first state, the control unit 104d reads the operation information from the memory 103d (step S405e). In step S405e, the first operation information B11 shown in FIG. 15 is read. As shown in FIG. 15, in the first operation information B11, an operation corresponding to the first state of the shooting operation switch 101b at the initial timing is non-execution. Thus, the imaging is not executed, and the initial imaging process corresponding to the first shooting mode ends.

When the state of the shooting operation switch 101b is not the first state, the control unit 104d determines whether or not the state of the shooting operation switch 101b determined in step S405c is the second state (step S405f). When the state of the shooting operation switch 101b is the second state, the control unit 104d reads the operation information from the memory 103d (step S405g). In step S405g, the first operation information B11 shown in FIG. 15 is read. As shown in FIG. 15, in the first operation information B11, the operation corresponding to the second state of the shooting operation switch 101b at the initial timing is execution of the still image imaging. Thus, the control unit 104d instructs the imaging module 102 to execute the still image imaging. The imaging module 102 executes the still image imaging based on the instruction given from the control unit 104d (step S405h). After the still image imaging is executed, the initial imaging process corresponding to the first shooting mode ends.

When the state of the shooting operation switch 101b is not the second state, the state of the shooting operation switch 101b is the third state. The control unit 104d reads the operation information from the memory 103d (step S405i). In step S405i, the first operation information B11 shown in FIG. 15 is read. As shown in FIG. 15, in the first operation information B11, the operation corresponding to the third state of the shooting operation switch 101b at the initial timing is execution of the autofocusing. Thus, the control unit 104d instructs the imaging module 102 to execute the autofocusing. The imaging module 102 adjusts the focus based on the instruction given from the control unit 104d (step S405j). After the autofocusing is executed, the initial imaging process corresponding to the first shooting mode ends.

Figure 18:
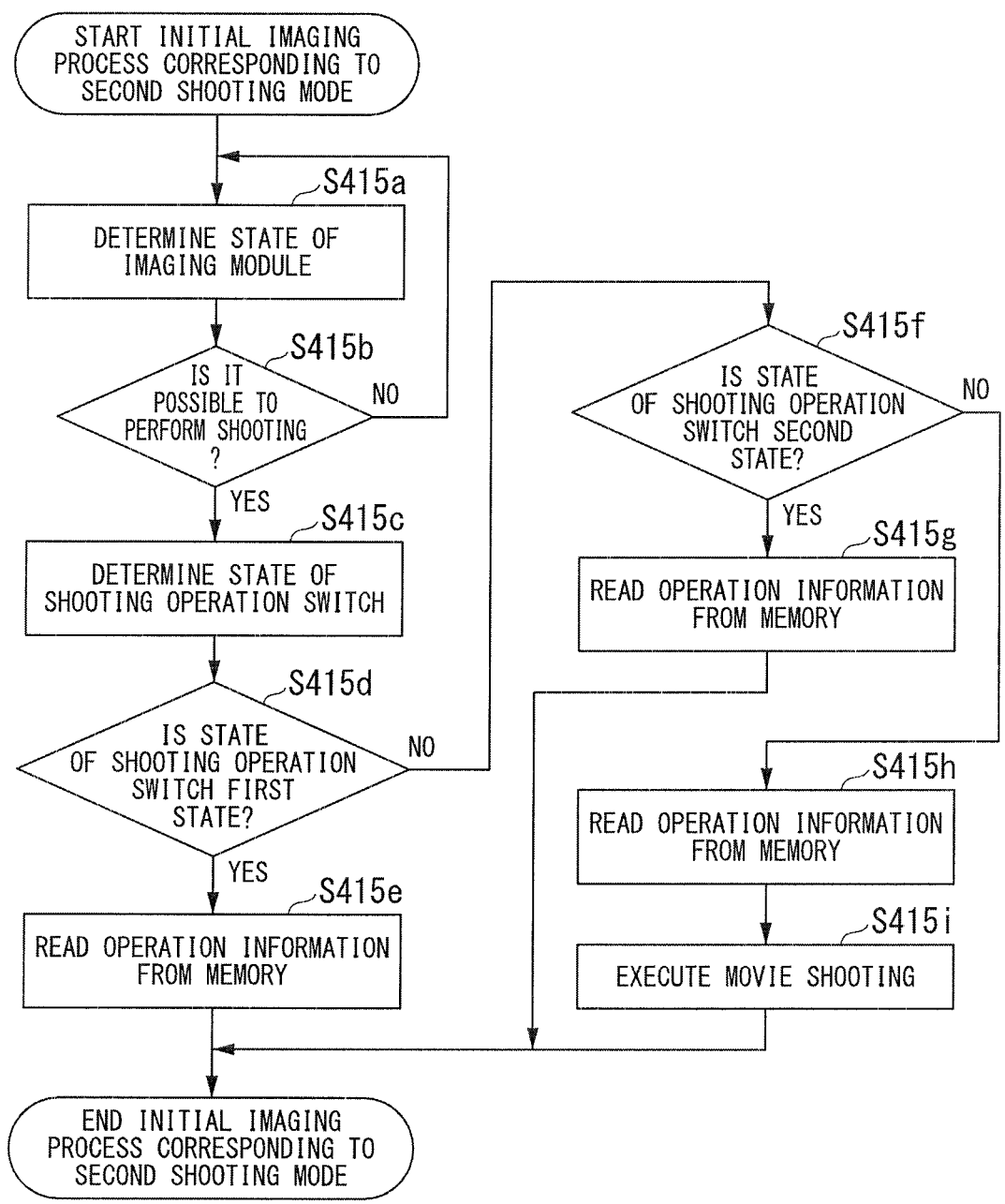
FIG. 18 is a flowchart showing a procedure of an initial imaging process according to Embodiment 4 of the present invention.

FIG. 18 shows a procedure of the initial imaging process (step S415) corresponding to the second shooting mode. The initial imaging process corresponding to the second shooting mode will be described with reference to FIG. 18.

The control unit 104d determines the state of the imaging module 102 (step S415a). After the state of the imaging module 102 is determined, the control unit 104d determines whether or not it is possible to perform imaging based on the state of the imaging module 102 determined in step S415a (step S415b). When it is difficult to perform imaging, the process of step S415a is performed again.

When it is possible to perform imaging, that is, when the imaging module 102 is in the imaging-enabled state, the control unit 104d determines the state of the shooting operation switch 101b (step S415c). After the state of the shooting operation switch 101b is determined, the control unit 104d determines whether or not the state of the shooting operation switch 101b determined in step S415c is the first state (step S415d).

When the state of the shooting operation switch 101b is the first state, the control unit 104d reads the operation information from the memory 103d (step S415e). In step S415e, the second operation information B12 shown in FIG. 15 is read. As shown in FIG. 15, in the second operation information B12, the operation corresponding to the first state of the shooting operation switch 101b at the initial timing is non-execution. Thus, imaging is not executed, and the initial imaging process corresponding to the second shooting mode ends.

When the state of the shooting operation switch 101b is not the first state, the control unit 104d determines whether or not the state of the shooting operation switch 101b determined in step S415c is the second state (step S415f). When the state of the shooting operation switch 101b is the second state, the control unit 104d reads the operation information from the memory 103d (step S415g). In step S415g, the second operation information B12 shown in FIG. 15 is read. As shown in FIG. 15, in the second operation information B12, the operation corresponding to the second state of the shooting operation switch 101b at the initial timing is non-execution. Thus, imaging is not executed, and the initial imaging process corresponding to the second shooting mode ends.

When the state of the shooting operation switch 101b is not the second state, the state of the shooting operation switch 101b is the third state. The control unit 104d reads the operation information from the memory 103d (step S415h). In step S415h, the second operation information B12 shown in FIG. 15 is read. As shown in FIG. 15, in the second operation information B12, the operation corresponding to the third state of the shooting operation switch 101b at the initial timing is execution of the movie imaging. Thus, the control unit 104d instructs the imaging module 102 to execute the movie imaging. The imaging module 102 executes the movie imaging based on the instruction given from the control unit 104d (step S415i). After the movie imaging is executed, the initial imaging process corresponding to the second shooting mode ends.

Figure 19:
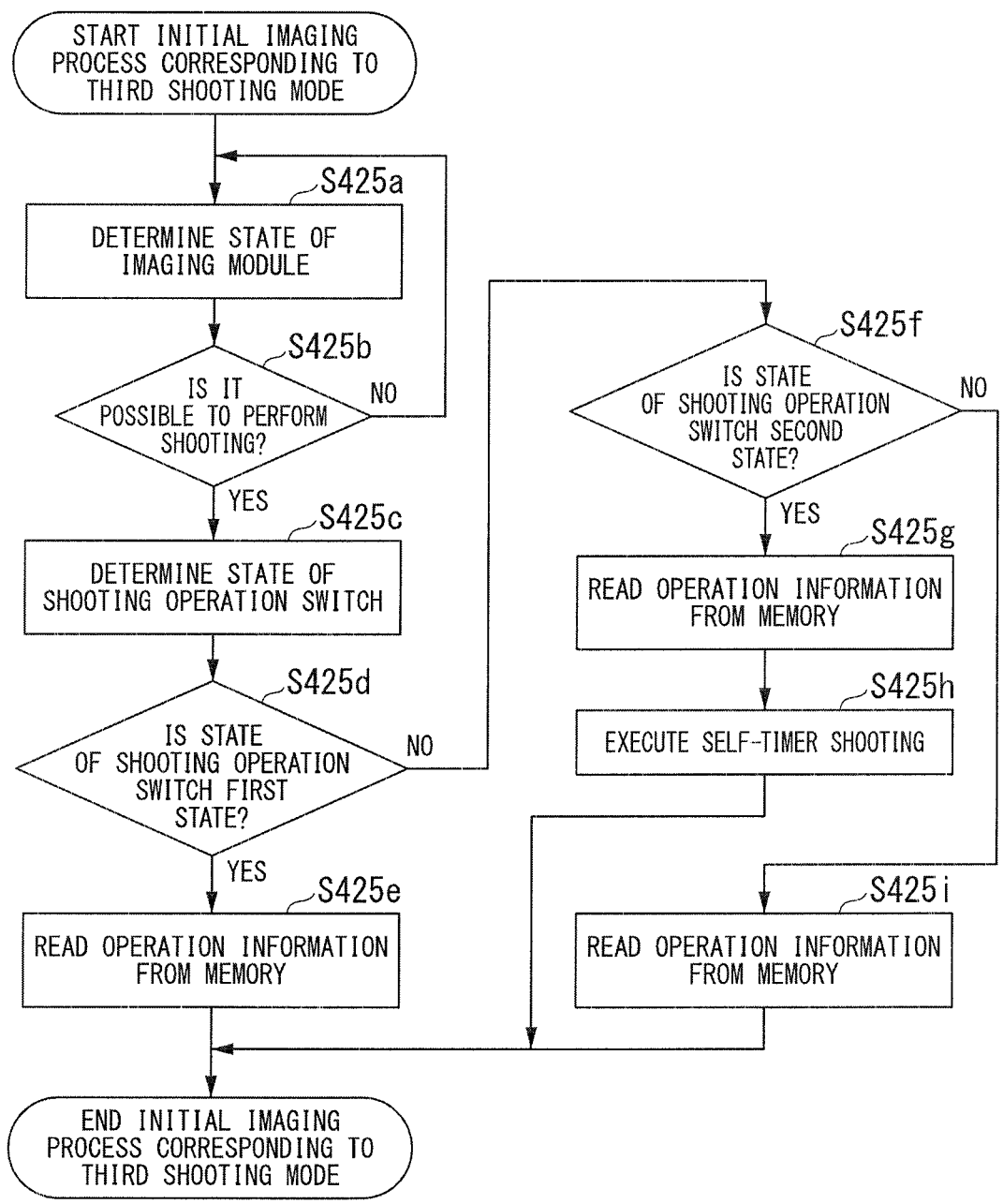
FIG. 19 is a flowchart showing a procedure of an initial imaging process according to Embodiment 4 of the present invention.

FIG. 19 shows a procedure of the initial imaging process (step S425) corresponding to the third shooting mode. The initial imaging process corresponding to the third shooting mode will be described with reference to FIG. 19.

The control unit 104d determines the state of the imaging module 102 (step S425a). After the state of the imaging module 102 is determined, the control unit 104d determines whether or not it is possible to perform imaging based on the state of the imaging module 102 determined in step S425a (step S425b). When it is difficult to perform imaging, the process of step S425a is performed again.

When it is possible to perform imaging, that is, when the imaging module 102 is in the imaging-enabled state, the control unit 104d determines the state of the shooting operation switch 101b (step S425c). After the state of the shooting operation switch 101b is determined, the control unit 104d determines whether or not the state of the shooting operation switch 101b determined in step S425c is the first state (step S425d).

When the state of the shooting operation switch 101b is the first state, the control unit 104d reads the operation information from the memory 103d (step S425e). In step S425e, the third operation information B13 shown in FIG. 15 is read. As shown in FIG. 15, in the third operation information B13, the operation corresponding to the first state of the shooting operation switch 101b at the initial timing is non-execution. Thus, imaging is not executed, and the initial imaging process corresponding to the third shooting mode ends.

When the state of the shooting operation switch 101b is not the first state, the control unit 104d determines whether or not the state of the shooting operation switch 101b determined in step S425c is the second state (step S425f). When the state of the shooting operation switch 101b is the second state, the control unit 104d reads the operation information from the memory 103d (step S425g). In step S425g, the third operation information B13 shown in FIG. 15 is read. As shown in FIG. 15, in the third operation information B13, the operation corresponding to the second state of the shooting operation switch 101b at the initial timing is execution of the self-timer shooting. Thus, the control unit 104d instructs the imaging module 102 to execute the self-timer shooting. The imaging module 102 executes the self-timer shooting based on the instruction given from the control unit 104d (step S425h). After the self-timer shooting is executed, the initial imaging process corresponding to the third shooting mode ends.

When the state of the shooting operation switch 101b is not the second state, the state of the shooting operation switch 101b is the third state. The control unit 104d reads the operation information from the memory 103d (step S425i). In step S425i, the third operation information B13 shown in FIG. 15 is read. As shown in FIG. 15, in the third operation information B13, the operation corresponding to the third state of the shooting operation switch 101b at the initial timing is non-execution. Thus, imaging is not executed, and the initial imaging process corresponding to the third shooting mode ends.

The process shown in FIGS. 17 to 19 is an example in a specific shooting mode. The process shown in FIGS. 17 to 19 is changed according to the shooting mode and the operation information.

In the above description, it is possible to perform the initial imaging process in both the second shooting mode and the third shooting mode. However, it may be possible to perform the initial imaging process in either of the second shooting mode and the third shooting mode. Further, it may not be possible to perform the initial imaging process in the first shooting mode.

In Embodiment 4, the imaging device 10d can perform an operation related to imaging directly after the imaging device 10d is activated and the imaging module 102 enters the imaging-enabled state. The imaging device 10d can perform an operation according to the state of the shooting operation switch 101b at the initial timing for each shooting mode. The user can easily select an operation at the initial timing by operating the operation of the shooting operation switch 101b.

Fifth Embodiment

Figure 20:
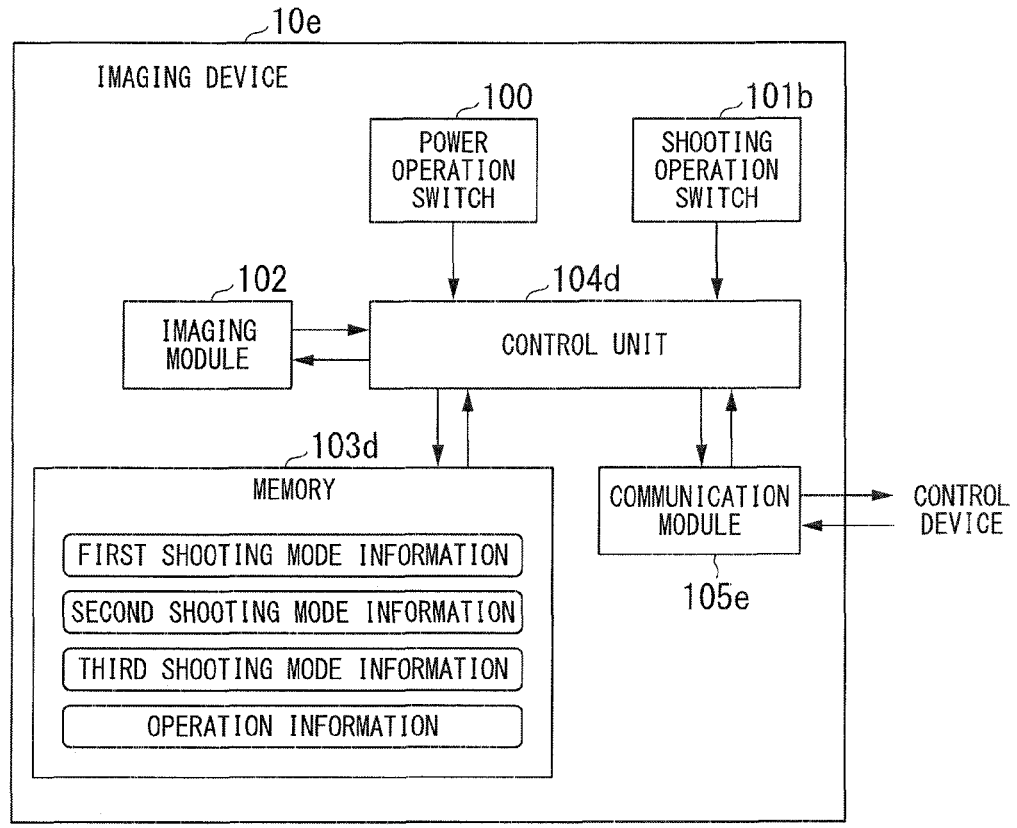
FIG. 20 is a block diagram showing a constitution of an imaging device according to Embodiment 5 of the present invention.

In an imaging system according to Embodiment 5 of the present invention, the imaging device 10c of the imaging system 1 shown in FIG. 9 is replaced with an imaging device 10e shown in FIG. 20. Further, the control device 20c of the imaging system 1 shown in FIG. 9 is replaced with a control device 20e shown in FIG. 21.

FIG. 20 shows a constitution of the imaging device 10e As shown in FIG. 20, the imaging device 10e includes a power operation switch 100, a shooting operation switch 101b, an imaging module 102, a memory 103d, a control unit 104d, and a communication module 105e (a first communication module). A power source of the imaging device 10e is not shown. The power source of the imaging device 10e may be removable from the imaging device 10e.

Differences between the constitution shown in FIG. 20 and the constitution shown in FIG. 14 will be described. The communication module 105e performs wireless communication with the control device 20e. The communication module 105e wirelessly receives the second shooting mode information or the third shooting mode information and the operation information from the control device 20e. The memory 103d stores the first shooting mode information, the second shooting mode information, the third shooting mode information, and the operation information. The memory 103d further stores the second shooting mode information or the third shooting mode information and the operation information that are wirelessly received through the communication module 105e.

Except this point, the constitution shown in FIG. 20 is the same as the constitution shown in FIG. 14.

Figure 21:
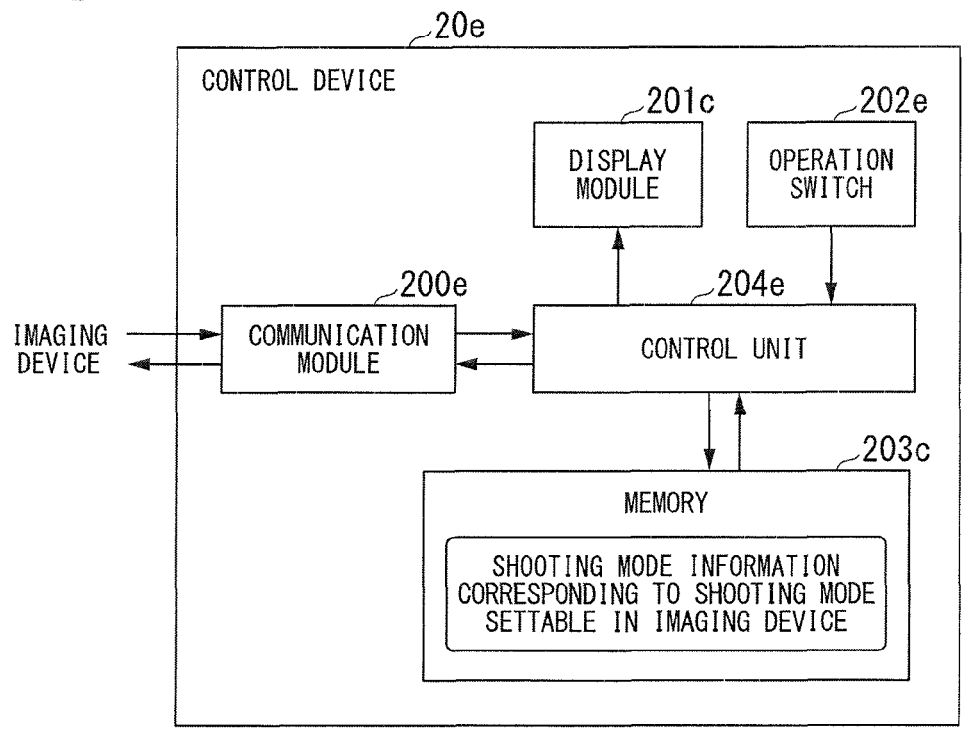
FIG. 21 is a block diagram showing a constitution of a control device according to Embodiment 5 of the present invention.

FIG. 21 shows a constitution of the control device 20e As shown in FIG. 21, the control device 20e includes a communication module 200e (a second communication module), a display module 201c, an operation switch 202e, a memory 203c, and a control unit 204e. A control device according to one aspect of the present invention may not have a constitution other than a constitution supporting the communication module 200e.

The communication module 200e performs wireless communication with the imaging device 10e. The communication module 200e wirelessly transmits the second shooting mode information or the third shooting mode information and the operation information to the imaging device 10e.

The operation switch 202e receives an operation of selecting any one of the shooting modes displayed by the display module 201c Further, the operation switch 202e receives an operation of selecting at least one operation of execution of an operation and non-execution of an operation. For example, when the operation switch 202e is in contact with a part of the body of the user, the operation switch 202e receives an operation from the user. Upon receiving the operation, the operation switch 202e outputs a signal according to the operation to the control unit 204e. A shape and structure of the operation switch 202e are arbitrary. For example, the operation switch 202e is a touch panel.

The control unit 204e reads the shooting mode information corresponding to the shooting mode selected by the user from the memory 203c. The control unit 204c generates the second shooting mode information or the third shooting mode information based on the read shooting mode information. Further, the control unit 204c generates the operation information based on a result of an operation of selecting at least one operation of execution and non-execution of an operation.

The second shooting mode information or the third shooting mode information indicating the shooting mode selected by the user is stored in the memory 103d of the imaging device 10e Thus, the imaging device 10e can change the second shooting mode information and the third shooting mode information stored in the memory 103d to the information corresponding to the shooting mode selected by the user. In other words, in Embodiment 5, the second shooting mode information and the third shooting mode information can be customized.

The operation information indicating the operation selected by the user is stored in the memory 103d of the imaging device 10e Thus, the imaging device 10e can change the operation information stored in the memory 103d to the information corresponding to the shooting mode selected by the user. In other words, in Embodiment 5, the operation information can be customized.

The process of activating the imaging device 10e is the same as the process of activating the imaging device 10b shown in FIG. 8. Thus, the process of activating the imaging device 10e is omitted.

Figure 22:
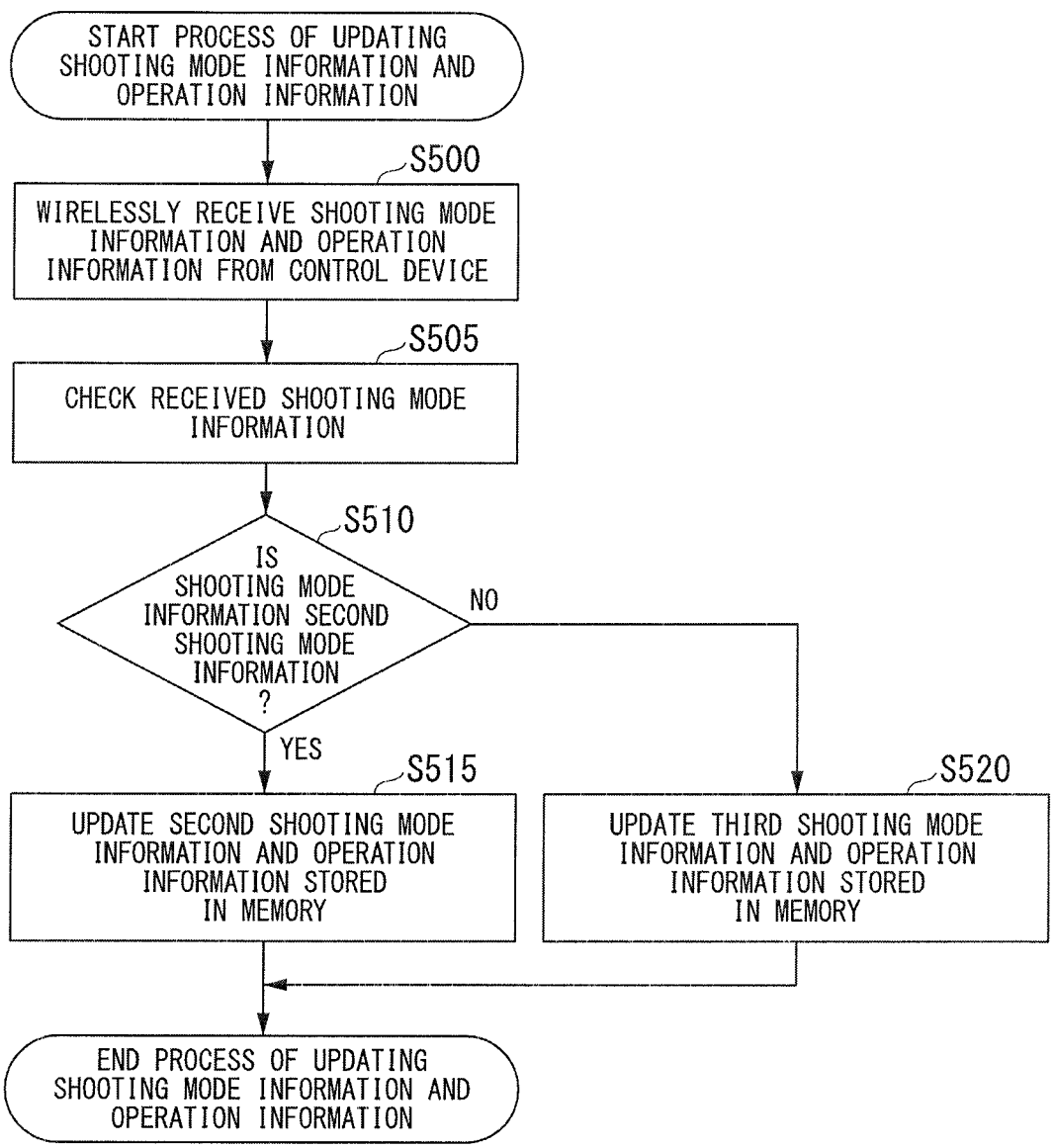
FIG. 22 is a flowchart showing a procedure of a process of updating shooting mode information and operation information according to Embodiment 5 of the present invention.

FIG. 22 shows a procedure of a process of updating the shooting mode information and the operation information which is performed by the imaging device 10e. The process of updating the shooting mode information and the operation information will be described with reference to FIG. 22.

After the imaging device 10e is activated, the communication module 105e wirelessly receives the shooting mode information and the operation information from the control device 20e (step S500). After the shooting mode information and the operation information are received, the control unit 104d checks the received shooting mode information (step S505).

After the received shooting mode information is checked, the control unit 104d determines whether or not the received shooting mode information is the second shooting mode information (step S510). For example, the information indicating the state of the shooting operation switch 101b is added to the received shooting mode information. When the information indicating the second state is added to the shooting mode information, the received shooting mode information can be determined to be the second shooting mode information. When the information indicating the third state is added to the shooting mode information, the received shooting mode information can be determined to be the third shooting mode information.

When the received shooting mode information is the second shooting mode information, the control unit 104d updates the second shooting mode information stored in the memory 103d by the received shooting mode information. Further, the control unit 104d updates the operation information stored in the memory 103d by the received operation information (step S515). As a result, the second shooting mode information stored in the memory 103d indicates the shooting mode selected by the user. Further, the operation information stored in the memory 103d indicates an operation selected by the user.

When the received shooting mode information is not the second shooting mode information, the received shooting mode information is the third shooting mode information. The control unit 104b updates the third shooting mode information stored in the memory 103d by the received shooting mode information. Further, the control unit 104d updates the operation information stored in the memory 103d by the received operation information (step S520). As a result, the third shooting mode information stored in the memory 103d indicates the shooting mode selected by the user. Further, the operation information stored in the memory 103d indicates an operation selected by the user.

After the above process is performed, the process of updating the shooting mode information and the operation information ends.

Figure 23:
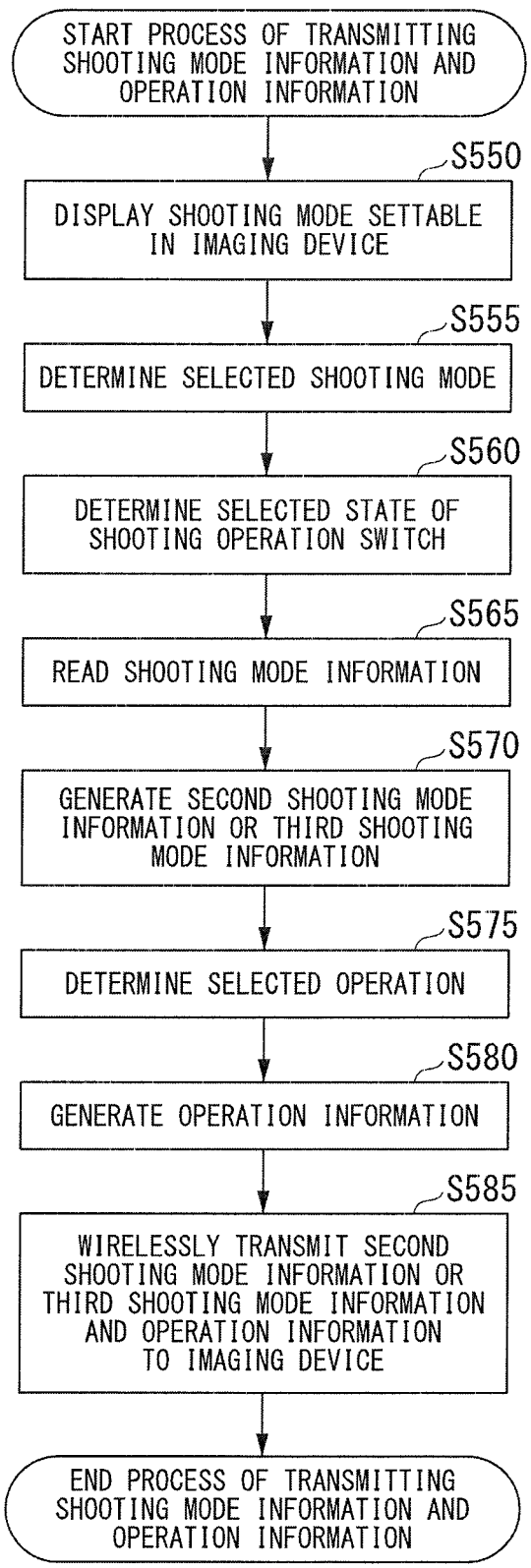
FIG. 23 is a flowchart showing a procedure of a process of transmitting shooting mode information and operation information according to Embodiment 5 of the present invention.

FIG. 23 shows a procedure of a process of transmitting the shooting mode information and the operation information that is performed by the control device 20e. The process of transmitting the shooting mode information and the operation information will be described with reference to FIG. 23.

The control unit 204e reads one or more pieces of shooting mode information corresponding to one or more shooting modes settable in the imaging device 10e from the memory 203c, and outputs the read shooting mode information to the display module 201c. The display module 201c displays one or more shooting modes settable in the imaging device 10e based on the shooting mode information (step S550).

After the shooting mode is displayed, the operation switch 202e receives an operation of selecting a shooting mode. The control unit 204e determines the selected shooting mode (step S555). After the selected shooting mode is determined, the operation switch 202e receives an operation of selecting the state of the shooting operation switch 101b. The control unit 204e determines the selected state of the shooting operation switch 101b (step S560).

After the selected state of the shooting operation switch 101b is determined, the control unit 204e reads the shooting mode information corresponding to the shooting mode determined in step S555 from the memory 203c (step S565). The control unit 204e generates the second shooting mode information or the third shooting mode information based on the read shooting mode information and the state of the shooting operation switch 101b determined in step S560 (step S570). For example, when the second state is determined, the control unit 204e generates the second shooting mode information by adding the information indicating the second state to the read shooting mode information. Alternatively, when the third state is determined, the control unit 204e generates the third shooting mode information by adding the information indicating the third state to the read shooting mode information. The generated second shooting mode information or the third shooting mode information is output to the communication module 200e.

After the second shooting mode information or the third shooting mode information is generated, the operation switch 202e receives an operation of selecting at least one operation of execution of an operation and non-execution of an operation. The control unit 204e determines the selected operation (step S575). The operation switch 202e can receive an operation of selecting an operation for each state of the shooting operation switch 101b at the initial timing. In step S575, the display module 201c may display a selectable operation.

After the selected operation is determined, the control unit 204e generates the operation information based on the selected operation (step S580). The generated operation information is output to the communication module 200e The operation information generated in step S580 corresponds to the second shooting mode or the third shooting mode indicated by the second shooting mode information or the third shooting mode information generated in step S570. The communication module 200e wirelessly transmits the second shooting mode information or the third shooting mode information and the operation information to the imaging device 10e (step S585).

After the above process is performed, the process of transmitting the shooting mode information and the operation information ends.

In the above description, it is possible to update both the second shooting mode information and the third shooting mode information held in the imaging device 10e However, it may be possible to update either of the second shooting mode information and the third shooting mode information held in the imaging device 10e Further, through the same method, it may be possible to update the first shooting mode information held in the imaging device 10e.

In Embodiment 5, it is possible to change the second shooting mode information and the third shooting mode information to the information corresponding to the shooting mode selected by the user. Further, it is possible to change the operation information to information corresponding to the operation selected by the user.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device that is activated in any one of a plurality of shooting modes including a first shooting mode and a second shooting mode different from the first shooting mode, the imaging device comprising:
   a power operation switch configured to receive an operation of turning on a power source of the imaging device;
   a shooting operation switch configured to be in any one of a plurality of states including a first state and a second state, not to receive a shooting instruction operation in the first state, and to receive the shooting instruction operation in the second state after the imaging device is activated;
   an imaging module configured to perform imaging when the power source is turned on and the shooting operation switch is in the second state;
   a memory configured to store first shooting mode information indicating the first shooting mode and second shooting mode information indicating the second shooting mode;
   a control unit configured to activate the imaging device,
      wherein, when the shooting operation switch is in the first state during the power source transitions from an OFF state to an ON state, the control unit reads the first shooting mode information from the memory, and activates the imaging device in the first shooting mode indicated by the read first shooting mode information, and
      when the shooting operation switch is in the second state and the power source transitions from the OFF state to the ON state, the control unit reads the second shooting mode information from the memory, and activates the imaging device in the second shooting mode indicated by the read second shooting mode information; and
   a communication module configured to wirelessly receive the second shooting mode information,
      wherein the memory stores the second shooting mode information wirelessly received through the communication module.

2. The imaging device according to claim 1,
   wherein the imaging device is activated in any one of a plurality of shooting modes including the first shooting mode, the second shooting mode, and a third shooting mode different from both the first shooting mode and the second shooting mode,
   the shooting operation switch is in any one of a plurality of states including the first state, the second state, and a third state, and receives an instruction to autofocus to the imaging module in the third state after the imaging device is activated, the memory further stores third shooting mode information indicating the third shooting mode, and the control unit further reads the third shooting mode information from the memory, and activates the imaging device in the third shooting mode indicated by the read third shooting mode information when the shooting operation switch is in the third state and the power source transitions from the OFF state to the ON state.

3. The imaging device according to claim 2, wherein the third shooting mode is a self-timer shooting mode, and the second shooting mode is a movie shooting mode.

4. The imaging device according to claim 2, wherein the communication module wirelessly receives the third shooting mode information, and wherein the memory stores the third shooting mode information wirelessly received through the communication module.

5. The imaging device according to claim 2, wherein the memory further stores operation information indicating an operation according to a state of the shooting operation switch when the imaging device is activated in the third shooting mode, and the control unit further determines the state of the shooting operation switch directly after the imaging module first enters an imaging-enabled state, reads the operation information from the memory, and executes the operation that is indicated by the read operation information and corresponds to the determined state when the shooting operation switch is in the third state and the power source transitions from the OFF state to the ON state.

6. The imaging device according to claim 5, wherein the communication module wirelessly receives the third shooting mode information and the operation information, and wherein the memory stores the third shooting mode information and the operation information wirelessly received through the communication module.

7. The imaging device according to claim 1, wherein the memory further stores operation information indicating an operation according to a state of the shooting operation switch when the imaging device is activated in the second shooting mode, and the control unit further determines a state of the shooting operation switch directly after the imaging module first enters an imaging-enabled state, reads the operation information from the memory, and executes the operation that is indicated by the read operation information and corresponds to the determined state when the shooting operation switch is in the second state and the power source transitions from the OFF state to the ON state.

8. The imaging device according to claim 7, wherein the communication module wirelessly receives the second shooting mode information and the operation information, and wherein the memory stores the second shooting mode information and the operation information wirelessly received through the communication module.

9. An imaging system, comprising:
an imaging device configured to be activated in any one of a plurality of shooting modes including a first shooting mode and a second shooting mode different from the first shooting mode; and a control device,
wherein the imaging device includes
a power operation switch configured to receive an operation of turning on a power source of the imaging device,
a shooting operation switch configured to be in any one of a plurality of states including a first state and a second state, not to receive a shooting instruction operation in the first state, and to receive the shooting instruction operation in the second state after the imaging device is activated,
an imaging module configured to perform imaging when the power source is turned on and the shooting operation switch is in the second state,
a first communication module configured to wirelessly receive second shooting mode information indicating the second shooting mode,
a memory configured to store first shooting mode information indicating the first shooting mode and the second shooting mode information wirelessly received through the first communication module, and
a control unit configured to activate the imaging device,
wherein, when the shooting operation switch is in the first state during the power source transitions from an OFF state to an ON state, the control unit reads the first shooting mode information from the memory, and activates the imaging device in the first shooting mode indicated by the read first shooting mode information, and
when the shooting operation switch is in the second state and the power source transitions from the OFF state to the ON state, the control unit reads the second shooting mode information from the memory, and activates the imaging device in the second shooting mode indicated by the read second shooting mode information, and
the control device includes a second communication module configured to wirelessly transmit the second shooting mode information.

10. A method of activating an imaging device that is activated in any one of a plurality of shooting modes including a first shooting mode and a second shooting mode different from the first shooting mode,
the imaging device comprising:
a power operation switch configured to receive an operation of turning on a power source of the imaging device,
a shooting operation switch configured to be in any one of a plurality of states including a first state and a second state, not to receive a shooting instruction operation in the first state, and to receive the shooting instruction operation in the second state after the imaging device is activated,
an imaging module configured to perform imaging when the power source is turned on and the shooting operation switch is in the second state,
a memory configured to store first shooting mode information indicating the first shooting mode and second shooting mode information indicating the second shooting mode, and
a communication module configured to wirelessly receive the second shooting mode information,
the method of activating the imaging device comprising:
a first step in which the memory stores the second shooting mode information in advance,
wherein the second shooting mode information is wirelessly received through the communication module,
a second step of receiving an operation of turning on a power source of the imaging device through the power operation switch; and a third step of activating the imaging device,
  wherein, when the shooting operation switch is in the first state during the power source transitions from an OFF state to an ON state, the first shooting mode information is read from the memory, and the imaging device is activated in the first shooting mode indicated by the read first shooting mode information, and
  when the shooting operation switch is in the second state and the power source transitions from the OFF state to the ON state, the second shooting mode information is read from the memory, and the imaging device is activated in the second shooting mode indicated by the read second shooting mode information.

11. A non-transitory computer readable recording medium storing a program causing a computer of an imaging device to execute a first step to a third step, the imaging device being activated in any one of a plurality of shooting modes including a first shooting mode and a second shooting mode different from the first shooting mode,
  the imaging device comprising:
  a power operation switch configured to receive an operation of turning on a power source of the imaging device,
  a shooting operation switch configured to be in any one of a plurality of states including a first state and a second state, not to receive a shooting instruction operation in the first state, and to receive the shooting instruction operation in the second state after the imaging device is activated,
  an imaging module configured to perform imaging when the power source is turned on and the shooting operation switch is in the second state,
  a memory configured to store first shooting mode information indicating the first shooting mode and second shooting mode information indicating the second shooting mode, and
  a communication module configured to wirelessly receive the second shooting mode information,
  wherein,
  in the first step, the memory stores the second shooting mode information wirelessly received through the communication module,
  in the second step, an operation of turning on a power source of the imaging device is received through the power operation switch, and
  in the third step,
  when the shooting operation switch is in the first state during the power source transitions from an OFF state to an ON state, the first shooting mode information is read from the memory, and the imaging device is activated in the first shooting mode indicated by the read first shooting mode information, and
  when the shooting operation switch is in the second state and the power source transitions from the OFF state to the ON state, the second shooting mode information is read from the memory, and the imaging device is activated in the second shooting mode indicated by the read second shooting mode information.

* * * * *